(12) United States Patent  (10) Patent No.: US 7,420,796 B2
Ota  (45) Date of Patent: Sep. 2, 2008

(54) MULTILAYER CAPACITOR

(75) Inventor: Tetsuhiko Ota, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/926,677

(22) Filed: Oct. 29, 2007

(65) Prior Publication Data

US 2008/0106847 A1 May 8, 2008

(30) Foreign Application Priority Data

Nov. 7, 2006 (JP) ............................. 2006-301137

(51) Int. Cl.
*H01G 4/06* (2006.01)
(52) U.S. Cl. .............. 361/321.2; 361/321.1; 361/306.1; 361/306.3; 361/307; 361/308.1
(58) Field of Classification Search .............. 361/321.2, 361/321.1, 302–305, 306.1, 306.3, 307, 308.1, 361/311–313
See application file for complete search history.

(56) References Cited

U.S. PATENT DOCUMENTS

| 6,542,352 | B1 * | 4/2003 | Devoe et al. ............. 361/321.2 |
| 6,657,848 | B2 * | 12/2003 | Togashi et al. ............ 361/306.3 |
| 6,762,925 | B2 * | 7/2004 | Uchida et al. ............ 361/321.1 |
| 6,819,543 | B2 | 11/2004 | Vieweg et al. |
| 6,914,767 | B2 | 7/2005 | Togashi et al. |
| 6,934,145 | B2 * | 8/2005 | Hsieh et al. ............. 361/321.2 |
| 6,940,710 | B1 | 9/2005 | Lee et al. |
| 7,019,957 | B2 | 3/2006 | Togashi et al. |
| 7,019,958 | B2 | 3/2006 | Togashi et al. |
| 7,035,079 | B1 * | 4/2006 | Park et al. ................... 361/303 |
| 7,046,500 | B2 | 5/2006 | Lee et al. |
| 7,075,774 | B2 | 7/2006 | Togashi et al. |
| 7,196,897 | B2 | 3/2007 | Togashi et al. |
| 7,224,569 | B2 | 5/2007 | Togashi et al. |
| 7,224,572 | B2 | 5/2007 | Togashi et al. |
| 7,262,952 | B2 | 8/2007 | Lee et al. |
| 7,292,430 | B2 * | 11/2007 | Lee et al. .................. 361/306.3 |

FOREIGN PATENT DOCUMENTS

JP 2002-151349 A 5/2002
JP 2002-164256 A 6/2002

* cited by examiner

*Primary Examiner*—Nguyen T Ha
(74) *Attorney, Agent, or Firm*—Keating & Bennett, LLP

(57) ABSTRACT

A multi-terminal multilayer capacitor reducing an equivalent series inductance (ESL), whose design flexibility is high, in which cost of electrode material is low, and in which a structural defect hardly occurs includes lead portions of first and second internal electrodes and lead portions of third and fourth internal electrodes that are disposed along the length of each of two side surfaces so as to be alternately exposed. Preferably, the first and third internal electrodes, and the second and fourth internal electrodes are disposed so as to be arranged along the length of each side surface in a coplanar manner, with a predetermined distance provided between two internal electrodes. When viewed in a laminating direction of dielectric layers, a capacitor-forming portion of the first internal electrode does not overlap with a capacitor-forming portion of the fourth internal electrode, and a capacitor-forming portion of the second internal electrode does not overlap with a capacitor-forming portion of the third internal electrode.

9 Claims, 16 Drawing Sheets

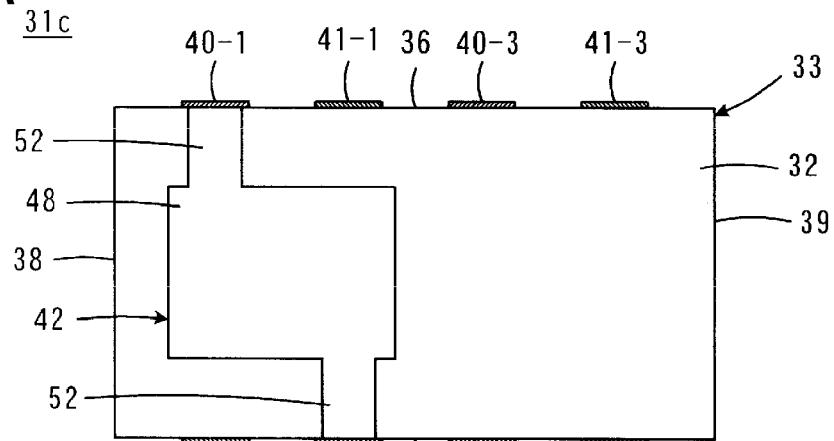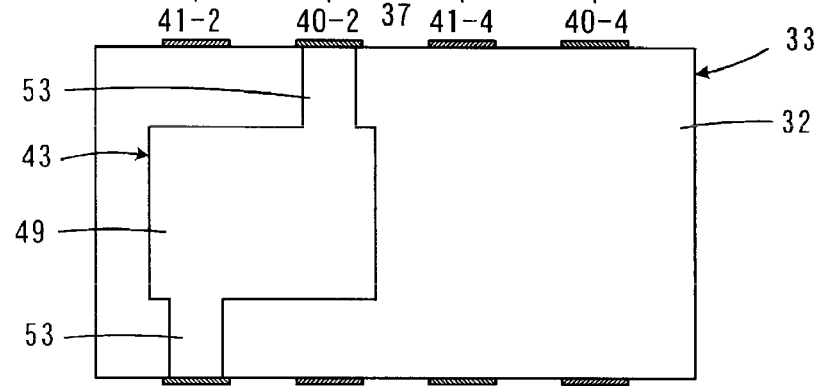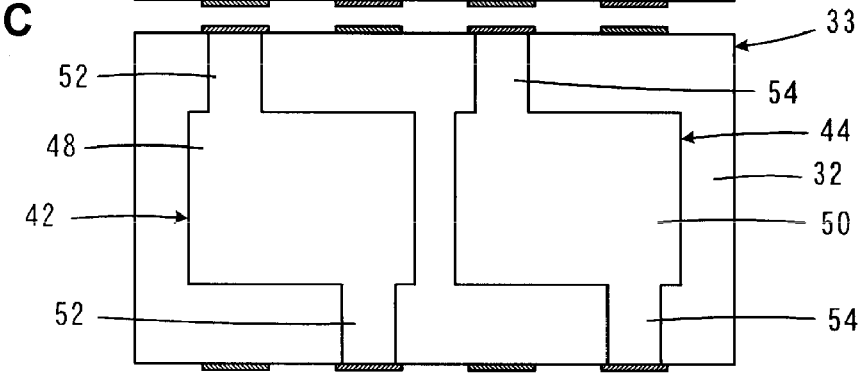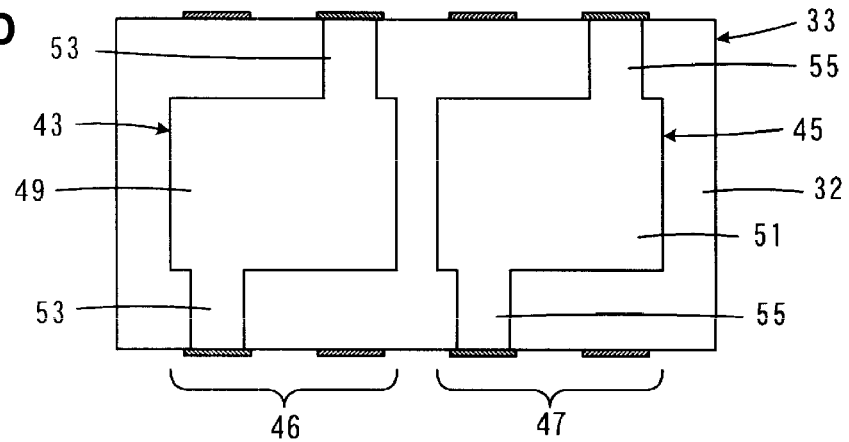

MULTILAYER CAPACITOR

BACKGROUND OF THE INVENTION

1. Field of the Invention

The present invention relates to multilayer capacitors, and in particular, to a multilayer capacitor that is a multi-terminal type that reduces an equivalent series inductance (ESL).

2. Description of the Related Art

When impedances of a power line and the ground in a power supply circuit cause large fluctuations in the power line, the operation of a driven circuit becomes unstable, interference between circuits via the power supply circuit occurs, and oscillation occurs. Accordingly, a decoupling capacitor is normally connected between the power line and the ground. The decoupling capacitor has a role of suppressing fluctuation in power-supply voltage and interference between circuits by reducing the impedance between the power line and the ground.

In recent years, in communication devices such as cellular phones and information processing devices such as personal computers, signal speed has been increased in order to process large amounts of information, and clock frequencies of ICs (integrated circuits) in use have also been increased. Accordingly, noise that includes many harmonic components is easily generated, and, in an IC power supply circuit, stronger decoupling needs to be performed.

To enhance a decoupling effect, use of a capacitor having good impedance frequency characteristics is effective. Capacitors adapted for the purpose include a multilayer capacitor. The multilayer capacitor has a good absorption effect in a broad frequency range compared with an electrolytic capacitor since the multilayer capacitor has a small ESL.

In general, a multilayer capacitor used as a decoupling capacitor for an IC is disposed in the vicinity of the IC. This is because, when voltage fluctuation occurs in a power supply line, by rapidly supplying electric charge from the capacitor to the IC, the start of the IC is prevented from being delayed.

However, when the capacitor charges or discharges, a counter electromotive force, represented by $dV=L \cdot di/dt$, is generated in the capacitor. When counter electromotive force dV is large, supply of electric charge to the IC is delayed. In the case of changing the IC clock frequency to a high frequency, a current fluctuation amount per unit, represented by $di/dt$, tends to increase. In other words, to reduce counter electromotive force dV, inductance, represented by L, needs to be decreased. Inductance L includes an inductance of a pattern from a power supply pin of the IC to the capacitor, an inductance of a pattern from the capacitor to the ground, and an ESL in the capacitor. In circuit design, there is a limitation in reducing the inductances of the patterns. Accordingly, it is requested that the ESL of the capacitor be more reduced.

Accordingly, as multilayer capacitors in which the ESL is more reduced, those disclosed in Japanese Unexamined Patent Application Publication Nos. 2002-151349 (see particularly FIGS. 3, 6, and 8), 2004-103883 (see particularly FIG. 1), and 2006-32904 (FIGS. 4, 7, and 13) have been proposed.

FIGS. 13A to 16B are plan views showing an internal structure of a multilayer capacitor by using sections including electrodes. FIGS. 13A and 13B show such a structure disclosed in Japanese Unexamined Patent Application Publication No. 2002-151349. FIGS. 14A to 14D show such a structure disclosed in Japanese Unexamined Patent Application Publication No. 2004-103883. FIGS. 15A to 16B show such a structure disclosed in Japanese Unexamined Patent Application Publication No. 2006-32904.

FIGS. 13A to 16B show, in common, a substantially rectangular parallelepiped laminate 6 which is formed by a plurality of laminated dielectric layers 1 and which includes first and second side surfaces 2 and 3 facing each other, and third and fourth side surfaces 4 and 5 facing each other. In FIGS. 13A to 16B, examples of current flows are indicated by dotted line arrows.

First, referring to FIGS. 13A and 13B, Japanese Unexamined Patent Application Publication No. 2002-151349 discloses a multi-terminal multilayer capacitor 8 in which a total of eight external terminal electrodes 7 are formed on the first and second side surfaces 2 and 3 of the laminate 6 which face each other. In the multilayer capacitor 8, an internal electrode 9 that leads to the first side surface 2 is disposed so as to face, in a coplanar manner, an internal electrode 10 that leads to the second side surface 3 facing the first side surface 2. Similarly, an internal electrode 11 is disposed so as to face an internal electrode 12 in a coplanar manner. According to this structure, currents that flow in the internal electrodes 9 to 12 are opposite in facing portions, whereby magnetic fields generated around the currents cancel one another, so that an ESL of the multilayer capacitor 8 decreases.

Next, referring to FIGS. 14A to 14D, Japanese Unexamined Patent Application Publication No. 2004-103883 discloses a multi-terminal multilayer capacitor 14 in which a total of eight external terminal electrodes 13 are formed on first to fourth side surfaces 2 to 5. In the multilayer capacitor 14, internal electrodes 15, 16, and 17 which face one another in a coplanar manner, and internal electrodes 18, 19, and 20 which face one another in a coplanar manner alternately lead to first and second side surfaces 2 and 3 of a laminate 6 which face each other. In addition, the internal electrodes 15 to 17, and 18 to 20 face common internal electrodes 21 and 22 in the laminating direction to form capacitors. The common internal electrodes 21 and 22 respectively lead to third and fourth side surfaces 4 and 5 of the laminate 6 which face each other. According to this structure, currents that flow in the internal electrodes 15 to 20 are opposite in facing portions, whereby magnetic fields generated around the currents cancel one another, so that an ESL of the multilayer capacitor 14 decreases.

Next, Japanese Unexamined Patent Application Publication No. 2006-32904 discloses various sorts of multi-terminal multilayer capacitors. For example, as shown in FIGS. 15A and 15B, a multi-terminal multilayer capacitor 24 in which a total of eight external terminal electrodes 23 are formed on first and second side surfaces of a laminate 6 which face each other. In the multilayer capacitor 24, in U-shaped internal electrodes 25 and 26 that face each other in a coplanar manner, and U-shaped internal electrodes 27 and 28 that face each other in a coplanar manner, currents are opposite in facing portions, whereby magnetic fields generated around the currents cancel one another, so that an ESL of the multilayer capacitor 24 decreases.

Japanese Unexamined Patent Application Publication No. 2006-32904 also discloses the multi-terminal multilayer capacitor 24a shown in FIGS. 16A and 16B. In the multilayer capacitor 24a, internal electrodes 25a and 26a face internal electrodes 27a and 28a in the laminating direction, and currents in facing portions are orthogonal, whereby magnetic fields generated around the currents are weakened, so that an ESL of the multilayer capacitor 24a decreases.

The structures described in Japanese Unexamined Patent Application Publication Nos. 2002-151349, 2004-103883, and 2006-32904 have the following problems to be solved.

In the structure described in Japanese Unexamined Patent Application Publication No. 2002-151349, the length of facing edges of the internal electrodes 9 and 10, or the length of facing edges of the internal electrodes 11 and 12 is subject to the distance between lead portions of each of the internal electrodes 9 and 12, that is, a pitch between the external terminal electrodes 7. The pitch between the external terminal electrodes 7 is set to be a predetermined distance or greater when considering a problem of short-circuiting, while the pitch between the external terminal electrodes 7 needs to be shortened to a predetermined distance or less in view of downsizing. Accordingly, in actual design, there is a limitation in pitch between the external terminal electrodes 7. As a result, there is a limitation in lengths of the facing edges of the internal electrodes 9 and 10 and the facing edges of the internal electrodes 11 and 12. Therefore, a method of adjusting the length of a current path by adjusting the lengths of the facing edges cannot be simply employed, and adjustment of an equivalent series resistance (ESR) of the multilayer capacitor 8 is not always facilitated.

The ESR affects stabilization of a power supply circuit. In other words, in a multilayer capacitor having a reduced ESL, an increased number of terminals increases the number of lead portions of internal electrodes. As a result, the ESR tends to be low. When the ESR is too low, there are problems in that inductance of a peripheral circuit causes a resonance phenomenon, so that power supply voltage greatly drops, or so that damped oscillation, such as ringing, easily occurs. Accordingly, it is necessary to increase the ESR to some extent. However, in the structure described in Japanese Unexamined Patent Application Publication No. 2002-151349, as described above, ESR adjustment is not always facilitated.

In addition, in the structure described in Japanese Unexamined Patent Application Publication No. 2002-151349, two separate capacitor portions are formed. When increasing the number of capacitor portions, a new capacitor portion cannot be added in a width direction of the laminate 6, that is, a direction in which the third and fourth side surfaces 4 and 5 extend. Therefore, in a longitudinal direction of the laminate 6, that is, a direction in which the first and second side surfaces 2 and 3 extend, a new capacitor portion is added. In this case, similarly to the shown internal electrodes 9 to 12, one or more pairs of internal electrodes are formed, so that the number of capacitor portions increases by a multiple of 2, and the number of external terminal electrodes 7 increases in the longitudinal direction by a multiple of 4. Accordingly, design flexibility is low, and, in addition, there is a problem in that, when adding capacitor portions, the laminate 6 is too elongated to cause a flexural strength of the laminate 6 to be low.

Next, in the structure described in Japanese Unexamined Patent Application Publication No. 2004-103883, the internal electrodes 21 and 22 that face, in common, the internal electrodes 15 to 17 or 18 to 20 include a portion that is not related to capacitor formation. From a capacitor-formation viewpoint, it may be said that an electrode material is not effectively used. In addition, since a bonding area of adjacent dielectric layers 1 for positioning each of the common internal electrodes 21 and 22 at an interface is small, there is also a problem in that a structural defect, such as delamination, easily occurs in the laminate 6. Further, the common internal electrodes 21 and 22 lead to the third and fourth side surfaces 4 and 5, which differ from the first and second side surfaces 2 and 3 from which the internal electrodes 15 to 20 lead. Thus, it is necessary to form the external terminal electrodes 13 on each of four side surfaces 2 to 5, so that there is a problem in that design flexibility is low.

Next, the multilayer capacitor 24, shown in FIGS. 15A and 15B, having the structure described in Japanese Unexamined Patent Application Publication No. 2006-32904, has problems similar to those in the structure described in Japanese Unexamined Patent Application Publication No. 2002-151349. In addition, similarly to the case of Japanese Unexamined Patent Application Publication No. 2004-103883, in the multilayer capacitor 24a shown in FIGS. 16A and 16B, the internal electrodes 25a to 28a include portions that are not related to capacitor formation. Accordingly, from a capacitor formation viewpoint, there is a problem in that an electrode material is not effectively used. In addition, similarly to the case of the Japanese Unexamined Patent Application Publication No. 2004-103883, in the structure described in Japanese Unexamined Patent Application Publication No. 2006-32904, a bonding area of adjacent dielectric layers 1 for positioning each of the internal electrodes 25 to 28 or 25a to 28a at an interface is small, so that there is a problem in that a structural defect, such as delamination, easily occurs in the laminate 6.

SUMMARY OF THE INVENTION

In order to overcome the problems described above, preferred embodiments of the present invention provide a multi-terminal multilayer capacitor that has high design flexibility, low cost of electrode material, and hardly ever experiences any structural defect hardly.

According to a preferred embodiment of the present invention, a multilayer capacitor includes a laminate including a plurality of laminated dielectric layers, having first and second side surfaces facing each other, and a plurality of external terminal electrodes disposed on the first and second side surfaces. In the laminate, first and second internal electrodes are arranged to define a first capacitor portion, and third and fourth internal electrodes are arranged to define a second capacitor portion.

The first and second internal electrodes include capacitor-forming portions that face each other, with a particular dielectric layer provided between the capacitor-forming portions, and at least two lead portions which lead from the capacitor-forming portions so as to be exposed from the first and second side surfaces and electrically connected to particular external terminal electrodes among the plurality of external terminal electrodes, and the lead portion of the first internal electrode and the lead portion of the second internal electrode are disposed so as to be alternately exposed along the length of each of the first and second side surfaces.

The third and fourth internal electrodes include capacitor-forming portions that face each other, with a particular dielectric layer provided between the capacitor-forming portions, and at least two lead portions which lead from the capacitor-forming portions so as to be exposed from the first and second side surfaces and electrically connected to particular external terminal electrodes among the plurality of external terminal electrodes, and the lead portion of the third internal electrode and the lead portion of the fourth internal electrode are disposed so as to be alternately exposed along the length of each of the first and second side surfaces.

The first and third internal electrodes are disposed so as to be arranged along the length of each of the first and second side surfaces, with a predetermined distance provided between the first and third internal electrodes. The second and fourth internal electrodes are disposed so as to be arranged along the length of each of the first and second side surfaces, with a predetermined distance provided between the second and fourth internal electrodes.

When viewed in a laminating direction of the dielectric layers, the capacitor-forming portion of the first internal electrode does not overlap with the capacitor-forming portion of the fourth internal electrode, and the capacitor-forming portion of the second internal electrode does not overlap with the capacitor-forming portion of the third internal electrode.

In the multilayer capacitor, preferably, along the length of each of the first and second side surfaces, the lead portion of the first internal electrode is adjacent to the lead portion of the third internal electrode, and the lead portion of the second internal electrode is adjacent to the lead portion of the fourth internal electrode.

In the multilayer capacitor, preferably, the first and third internal electrodes are positioned in a coplanar manner, and the second and fourth internal electrodes are positioned in a coplanar manner.

In the above case, in the laminating direction, plural sets of the first and second internal electrodes may be disposed, and, regarding at least one of the first internal electrodes, the third internal electrode may not be positioned in a coplanar manner, and, regarding at least one of the second internal electrodes, the fourth internal electrode may not be positioned in a coplanar manner.

In the multilayer capacitor, the first and third internal electrodes may be positioned so as to be shifted in the laminating direction, and the second and fourth internal electrodes may be positioned so as to be shifted in the laminating direction.

In addition, the areas of the capacitor-forming portions of the first and second internal electrodes may differ from the areas of the capacitor-forming portions of the third and fourth internal electrodes. In this case, the number of lead portions of the internal electrodes, which include capacitor-forming portions having larger areas, may be greater than the number of lead portions of the internal electrodes, which include capacitor-forming portions having smaller areas.

In the multilayer capacitor, in the laminate, fifth and sixth internal electrodes may be formed for forming a third capacitor portion. In this case, the fifth and sixth internal electrodes may include capacitor-forming portions that face each other, with a particular dielectric layer provided between the capacitor-forming portions, and at least two lead portions which lead from the capacitor-forming portions so as to be exposed from the first and second side surfaces and electrically connected to particular external terminal electrodes among the plurality of external terminal electrodes. The lead portion of the fifth internal electrode and the lead portion of the sixth internal electrode may be disposed so as to be alternately exposed along the length of each of the first and second side surfaces. The first, third, and fifth internal electrodes may be disposed so as to be arranged at predetermined intervals along the length of each of the first and second side surfaces. The second, fourth, and sixth internal electrodes may be disposed so as to be arranged at predetermined intervals along the length of each of the first and second side surfaces. When viewed in the laminating direction of the dielectric layers, the capacitor-forming portion of the fifth internal electrode may not overlap with the capacitor-forming portion of the second internal electrode or the capacitor-forming portion of the fourth internal electrode, and the capacitor-forming portion of the sixth internal electrode may not overlap with the capacitor-forming portion of the first internal electrode or the capacitor-forming portion of the third internal electrode.

According to various preferred embodiments of the present invention, each of first to fourth internal electrodes preferably includes at least two lead portions that lead from a capacitor-forming portion so as to be exposed from first and second side surfaces and electrically connected to a particular external terminal electrode. In addition, the first and third internal electrodes are disposed at predetermined intervals so as to be arranged along the length of each of the first and second side surfaces, and the second and fourth internal electrodes are disposed at predetermined intervals so as to be arranged along the length of each of the first and second side surfaces.

Therefore, the length of opposed edges of the first and third internal electrodes, and the length of opposed edges of the second and fourth internal electrodes can be freely adjusted regardless of a pitch between the external terminal electrodes. Accordingly, lengthening or shortening of current paths can be relatively freely performed. For example, an ESR of a multilayer capacitor can be arbitrarily adjusted.

When adding a capacitor portion, for example, a third capacitor portion other than first and second capacitor portions, a capacitor portion can be added individually along the length of the first and second side surfaces. Thus, design flexibility of the multilayer capacitor can be enhanced.

In addition, according to various preferred embodiments of the present invention, capacitor-forming portions of the first and fourth internal electrodes do not overlap with one another, and capacitor-forming portions of the second and third internal electrodes do not overlap with each other. Therefore, in each internal electrode, a portion that is unnecessary from a capacitor-formation viewpoint is prevented from existing. Thus, ineffective use of an electrode material is prevented, and, in addition, a bonding area of adjacent dielectric layers for positioning each internal electrode at an interface between the layers is ensured, so that, in a laminate, a structural defect, such as delamination, can hardly occur.

According to preferred embodiments of the present invention, each internal electrode includes at least two lead portions. Regarding the positions of the lead portions, the lead portion of the first internal electrode and the lead portion of the second internal electrode are disposed so as to be alternately exposed along the length of each of the first and second side surfaces, and the lead portion of the third internal electrode and the lead portion of the fourth internal electrode are disposed so as to be alternately exposed along the length of each of the first and second side surfaces. Thus, a current flow in each internal electrode can be directed in various directions, and current flows in adjacent lead portions can be made opposite, so that magnetic fields can mutually cancel. As a result, an ESL can be reduced.

In a multilayer capacitor according to preferred embodiments of the present invention, the lead portion of the first internal electrode and the lead portion of the third internal electrode are disposed so as to be adjacent, and the lead portion of the second internal electrode and the lead portion of the fourth internal electrode are disposed so as to be adjacent, whereby an effect of magnetic field cancellation can be enhanced.

In a multilayer capacitor according to various preferred embodiments of the present invention, the first and third internal electrodes are positioned in a coplanar manner, and the second and fourth internal electrodes are positioned in a coplanar manner, whereby an effect of magnetic field cancellation can be enhanced compared with a case in which internal electrodes forming each set are positioned so as to be shifted in a laminating direction.

In the above case, when plural sets of the first and second internal electrodes are disposed in the laminating direction, and, regarding at least one of the first internal electrodes, the third internal electrode is not positioned in a coplanar manner, and, regarding at least one of the second internal electrodes, the fourth internal electrode is not positioned in a coplanar manner, the capacitance of the second capacitor portion can be reduced more than that of the first capacitor portion. In this manner, by setting the first and second capacitor portions to have different capacitances, resonant frequencies of the capacitor portions differ. Thus, decoupling capacitor functions can be realized in a broader frequency range.

In preferred embodiments of the present invention, the areas of the capacitor-forming portions of the first and second internal electrodes differ from the areas of the capacitor-forming portions of the third and fourth internal electrodes, whereby the capacitances of the first and second capacitor portions can differ. Therefore, similarly to the above case, the resonant frequency of each capacitor portion differs. Thus, decoupling capacitor functions can be realized in a broader frequency range.

In the above-described various preferred embodiments, the number of lead portions of the internal electrodes, which include capacitor-forming portions having larger areas, preferably is greater than the number of lead portions of the internal electrodes, which include capacitor-forming portions having smaller areas, whereby an ESL of a capacitor portion formed by the internal electrodes, which include capacitor-forming portions having larger areas, can be reduced.

In various preferred embodiments of the present invention, when adding fifth and sixth internal electrodes to form a third capacitor portion, for example, by setting the first to third capacitor portions to have different capacitances, decoupling capacitor functions can be realized in a broader frequency range.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 8A to 8D are illustrations of a multilayer capacitor according to a fourth preferred embodiment of the present invention, and correspond to FIGS. 3A and 3B.

DETAILED DESCRIPTION OF PREFERRED EMBODIMENTS

Figure 1:
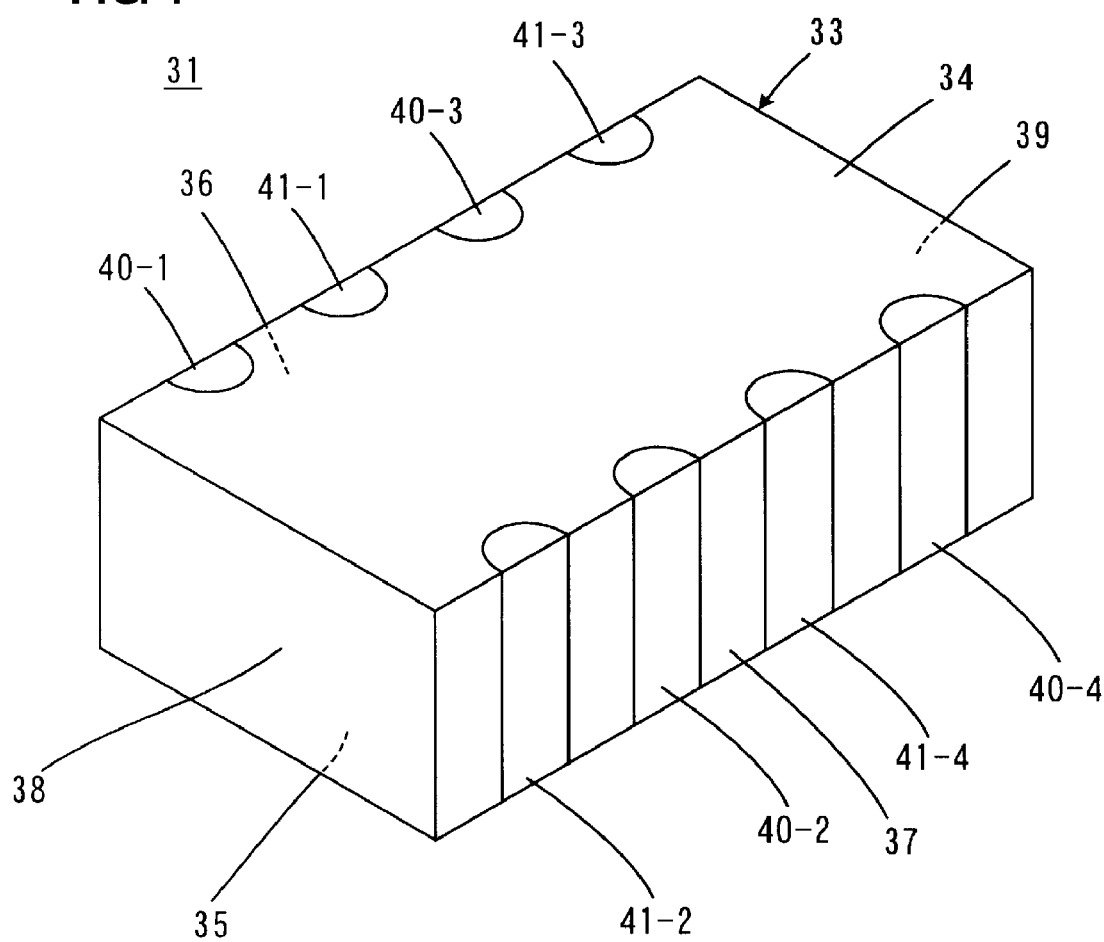
FIG. 1 is a perspective view showing a multilayer capacitor according to a first preferred embodiment of the present invention.
Figure 2:
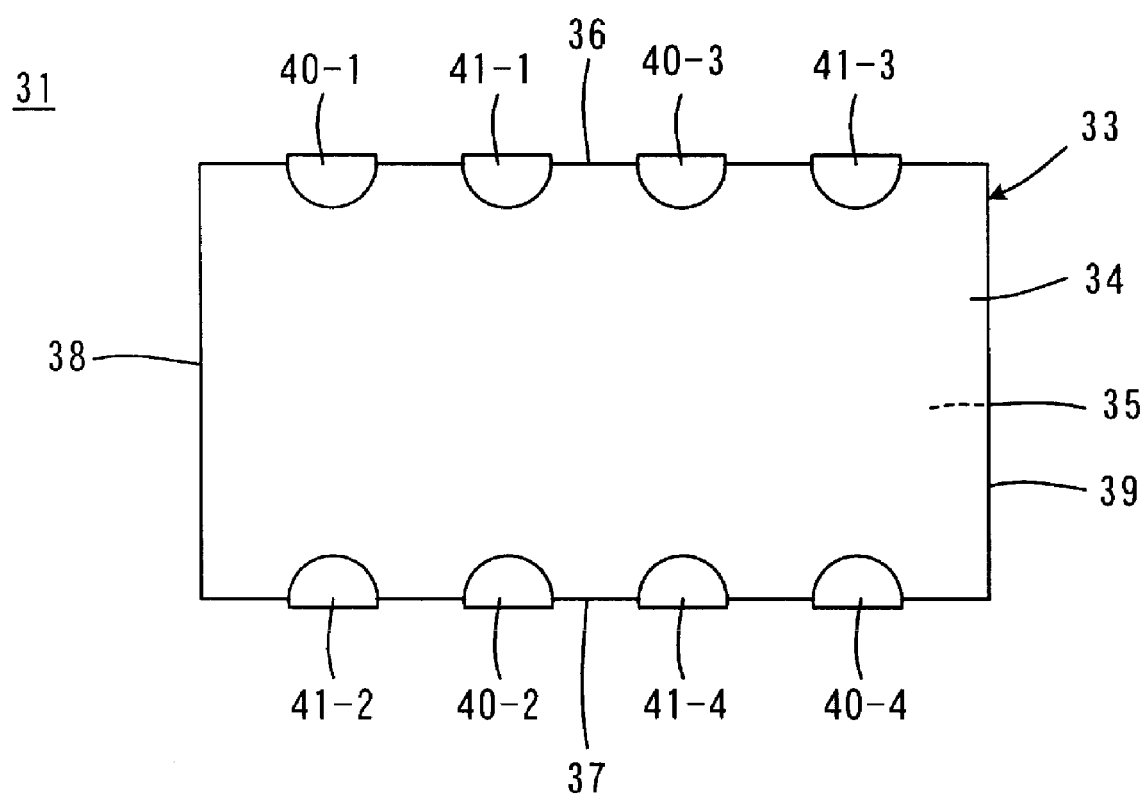
FIG. 2 is a plan view showing the exterior of the multilayer capacitor shown in FIG. 1.

FIGS. 1 to 4 illustrate a multilayer capacitor 31 according to a first preferred embodiment of the present invention. FIG. 1 is a perspective view showing the exterior of the multilayer capacitor 31. FIG. 2 is a plan view showing the exterior of the multilayer capacitor 31. FIGS. 3A and 3B are plan views showing an internal structure of the multilayer capacitor 31 by using particular sections. FIGS. 4A and 4B are the same plan views as FIGS. 3A and 3B, including dashed line arrows indicating the flows of currents.

The multilayer capacitor 31 includes a laminate 33 that preferably has a substantially rectangular parallelepiped shape and is preferably formed by laminating a plurality of dielectric layers 32. Each dielectric layer 32 is preferably formed of dielectric ceramic consisting primarily of, for example, $BaTiO_3$, $CaTiO_3$, $SrTiO_3$, $CaZrO_3$, or the like. An accessory component, such as a Mn compound, a Fe compound, a Cr compound, a Co compound, or a Ni compound, may be added to the above main component. The thickness of the dielectric layer 32 is, for example, about 1 μm to about 10 μm.

The laminate 33 has first and second main surfaces 34 and 35 that face each other, first and second side surfaces 36 and 37 that face each other and third and fourth side surfaces 38 and 39 that face each other, that connect the first and second main surfaces 34 and 35. The dielectric layer 32 extends in the direction of the main surfaces 34 and 35, and the side surfaces 36 to 39 extend in a laminating direction of the dielectric layers 32. The first and second side surfaces 36 and 37 are positioned along a longitudinal side of the dielectric layer 32.

Two groups of external terminal electrodes 40 and 41 are formed on the first and second side surfaces 36 and 37 of the laminate 33. In the first preferred embodiment, four external terminal electrodes 40 and 41 are formed on the first side surface 36, and four external terminal electrodes 40 and 41 are formed on the second side surface 37. Among the external terminal electrodes 40 and 41, a first polarity is assigned to first external terminal electrodes 40, and a second polarity is assigned to second external terminal electrodes 41. The first and second external terminal electrodes 40 and 41 are disposed so as to be alternately arranged.

When it is necessary to distinguish among the four first external terminal electrodes 40, reference numerals "40-1", "40-2", "40-3", and "40-4" are used for them. When it is necessary to distinguish among the four second external terminal electrodes 41, reference numerals "41-1", "41-2", "41-3", and "41-4" are used for them.

As an electrically conductive component of the external terminal electrodes 40 and 41, Cu, Ni, Ag, Pd, Ag—Pd alloy, Au, or the like, can be used. In general, the external terminal electrodes 40 and 41 are formed by applying a conductive paste and burning the conductive paste. In this case, the external terminal electrodes 40 and 41 may be formed by applying the conductive paste when the laminate 33 is in a state of un-sintering, and performing simultaneous burning of the paste together with internal electrodes (described later). Alternatively, the external terminal electrodes 40 and 41 may be formed by applying the conductive paste after the laminate 33 is burned, and burning it. It is preferable that the thickness of the external terminal electrodes 40 and 41 be a maximum of about 20 μm to about 100 μm, for example.

A plating film may be formed on the external terminal electrodes 40 and 41, if necessary. As metals forming the plating film, for example, Cu, Ni, Sn, Au, etc., may be used, and a plating film formed of plural layers such as Ni—Sn, Ni—Au, or Cu—Ni—Au, may be formed. It is preferable that the thickness of one layer of the plating film be about 1 μm to about 10 μm, for example. In addition, a resin layer for stress relaxation may be formed between the external terminal electrodes 40 and 41 and the plating film. The external terminal electrodes 40 and 41 may be formed by directly plating the surface of the laminate 33.

As shown in FIG. 3, first to fourth internal electrodes 42 to 45 are formed in the laminate 33. As an electrically conductive component included in each of the internal electrodes 42 to 45, for example, Ni, Cu, Ag, Pd, Ag—Pd alloy, or Au may be used. It is preferable that the thickness of each of the internal electrodes 42 to 45 be about 0.5 μm to about 2.0 μm, for example.

The first and second internal electrodes 42 and 43 are used to form a first capacitor portion 46, and the third and fourth internal electrodes 44 and 45 are used to form a second capacitor portion 47. At two ends of the laminate 33 in the laminating direction, a predetermined number of dielectric layers 32 on which any electrodes are not formed are laminated. In addition, the pattern, shown in FIG. 3A, of the internal electrodes 42 and 44, and the pattern, shown in FIG. 3B, of the internal electrodes 43 and 45, are repeated a plural number of times in the laminating direction.

The first and second internal electrodes 42 and 43 include capacitor-forming portions 48 and 49 that face each other, with one particular dielectric layer 32 provided therebetween. The first internal electrode 42 has two lead portions 52. The lead portions 52 lead from the capacitor-forming portion 48 so as to be exposed from the first and second side surfaces 36 and 37, and are electrically connected to the external terminal electrodes 40-1 and 40-2. The second internal electrode 43 has two lead portions 53. The lead portions 53 lead from the capacitor-forming portion 49 so as to be exposed from the first and second side surfaces 36 and 37, and are electrically connected to the external terminal electrodes 41-1 and 41-2. The lead portions 52 of the first internal electrode 42 and the lead portions 53 of the second internal electrode 43 are disposed so as to be alternately exposed along the length of each of the first and second side surfaces 36 and 37.

Similarly, the third and fourth internal electrodes 44 and 45 include capacitor-forming portions 50 and 51 that face each other, with one particular dielectric layer 32 provided therebetween. The third internal electrode 44 has two lead portions 54. The lead portions 54 lead from the capacitor-forming portion 50 so as to be exposed from the first and second side surfaces 36 and 37, and are electrically connected to the external terminal electrodes 40-3 and 40-4. The fourth internal electrode 45 has two lead portions 55. The lead portions 55 lead from the capacitor-forming portion 51 so as to be exposed from the first and second side surfaces 36 and 37, and are electrically connected to the external terminal electrodes 41-3 and 41-4. The lead portion 54 of the third internal electrode 44 and the lead portion 55 of the fourth internal electrode 45 are disposed so as to be alternately exposed along the length of each of the first and second side surfaces 36 and 37.

Figure 3A:
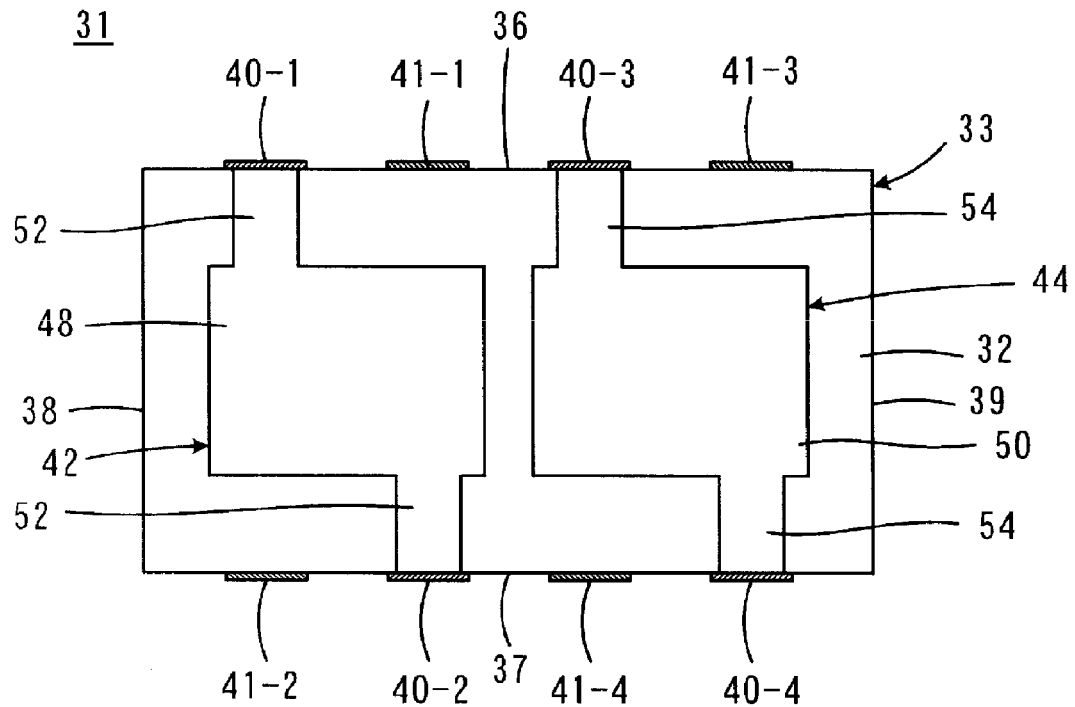
FIGS. 3A and 3B are plan views showing an internal structure of the multilayer capacitor shown in FIG. 1 by using sections including internal electrodes.

As shown in FIG. 3A, the first and third internal electrodes 42 and 44 are disposed in a coplanar manner so as to be arranged along the length of each of the first and second side surfaces 36 and 37, with a predetermined distance provided therebetween. Similarly, as shown in FIG. 3B, the second and fourth internal electrodes 43 and 45 are disposed in a coplanar manner so as to be arranged along the length of each of the first and second side surfaces 36 and 37, with a predetermined distance provided therebetween.

Figure 3B:
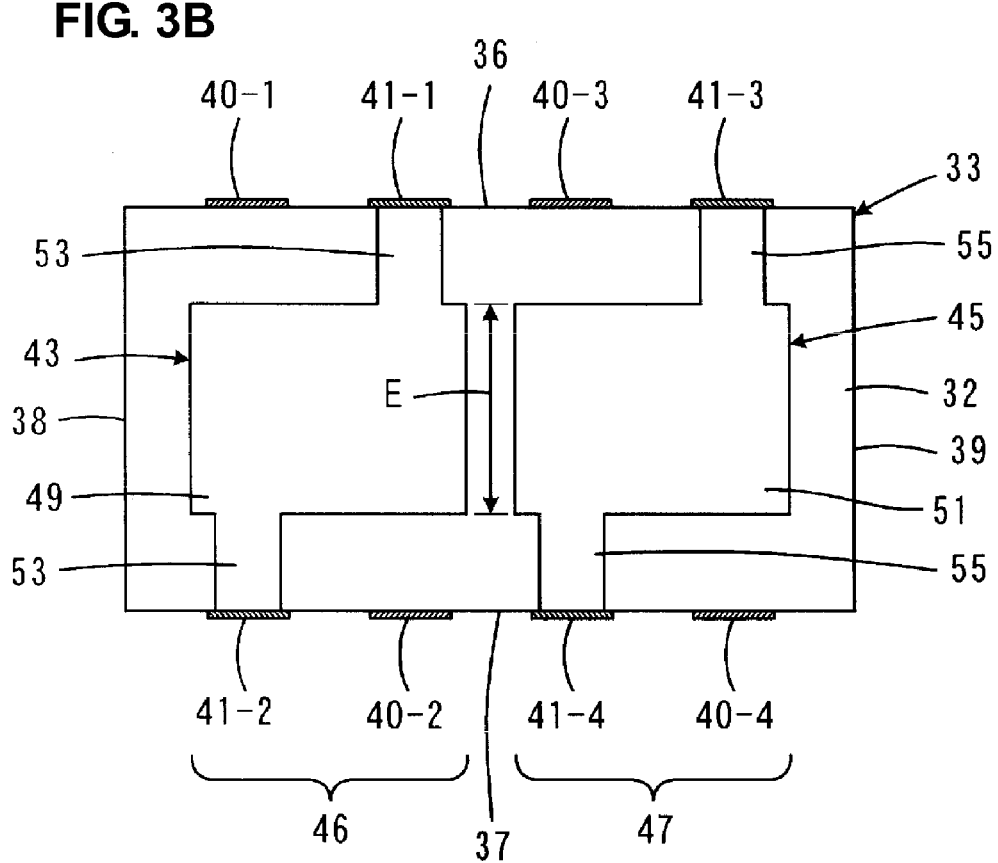

As can be found from FIGS. 3A and 3B, when viewed in the laminating direction of the dielectric layers 32, the capacitor-forming portion 48 of the first internal electrode 42 does not overlap with the capacitor-forming portion 51 of the fourth internal electrode 45, and the capacitor-forming portion 49 of the second internal electrode 43 does not overlap with the capacitor-forming portion 50 of the third internal electrode 44.

Figure 4A:
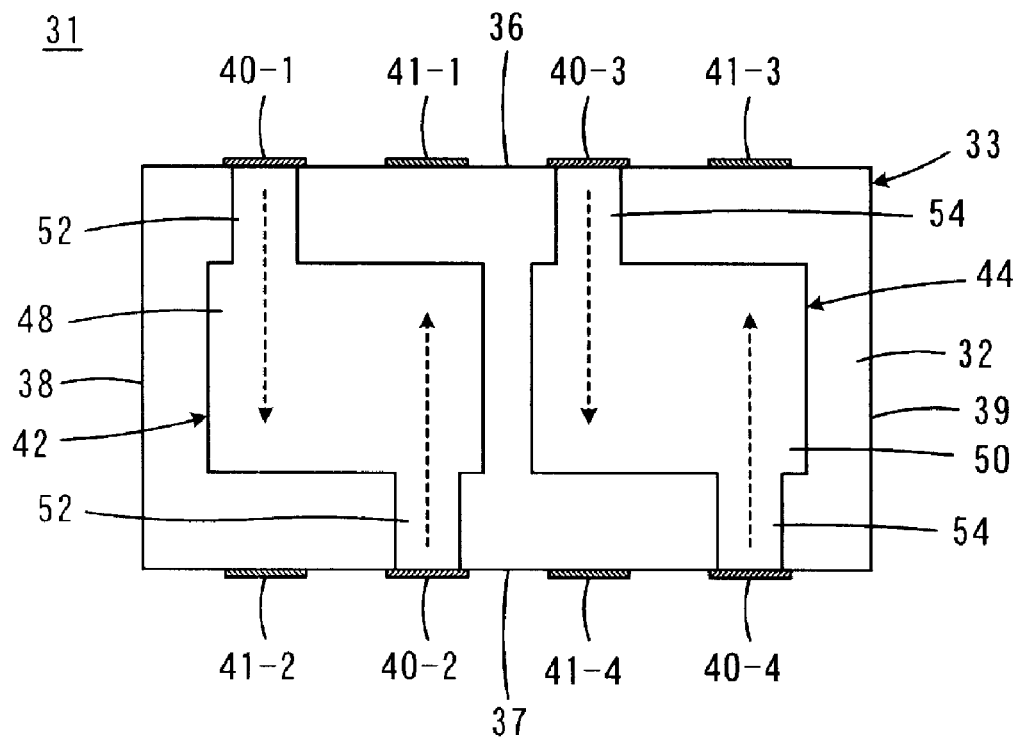
FIGS. 4A and 4B are illustrations showing examples of current flows by using dotted line arrows.
Figure 4B:
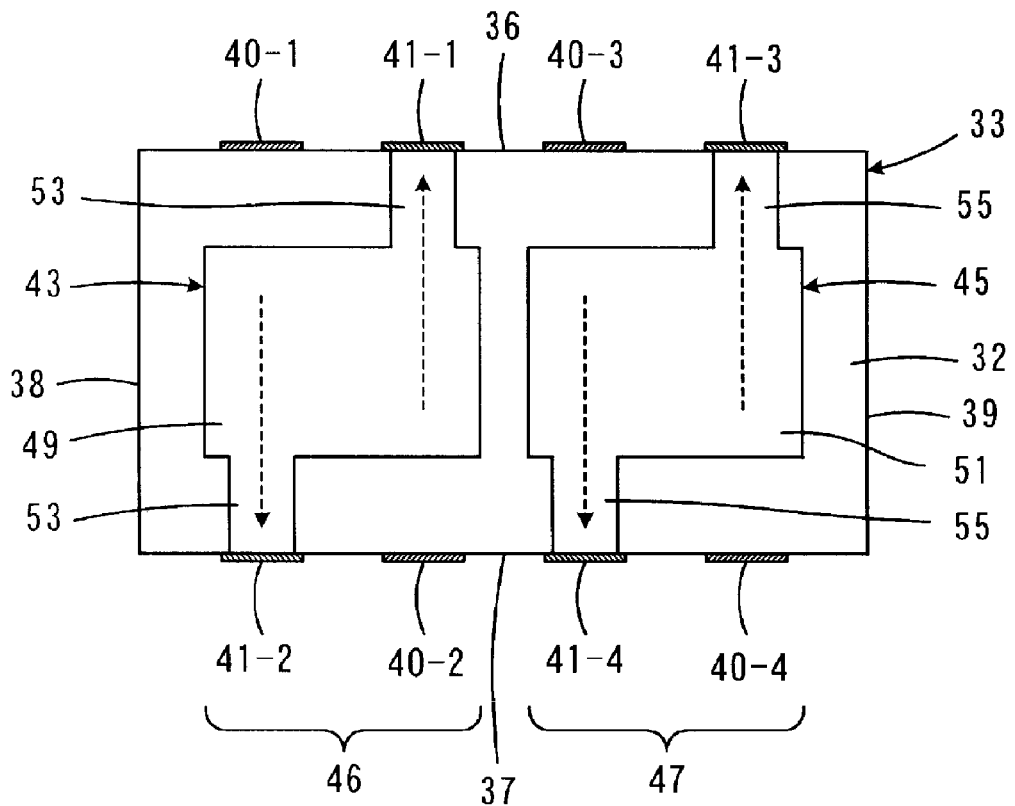

In FIGS. 4A and 4B, examples of current flows are indicated by the dashed line arrows. Referring to the lead portions 52 and 53 of the first and second internal electrodes 42 and 43, the lead portions 52 and 53 are alternately disposed, with one particular dielectric layer 32 provided therebetween, and the directions of currents flowing in the lead portions 52 and 53 are opposite. Therefore, magnetic fields generated around the currents flowing in the lead portions 52 and 53 cancel each other, so that an ESL decreases. This can apply to the lead portions 54 and 55 of the third and fourth internal electrodes 44 and 45.

Also, referring to the lead portions 53 and 54 of the second and third internal electrodes 43 and 44, the lead portions 53 and 54 are alternately disposed, with the particular dielectric layer 32 provided therebetween, and the directions of currents flowing in the lead portions 53 and 54 are opposite. Therefore, magnetic fields generated around the currents flowing in the lead portions 53 and 54 cancel each other, so that an ESL decreases. This can apply to the lead portions 52 and 55 of the first and fourth internal electrodes 42 and 45.

In addition, referring to the capacitor-forming portions 48 to 51, the first internal electrode 42 and the third internal electrode 44 are disposed so as to be arranged in a coplanar manner, with a predetermined distance provided therebetween. Thus, a current flowing at an edge of the capacitor-forming portion 48 of the first internal electrode 42 is opposite to a current flowing at an edge of the capacitor-forming portion 50 of the third internal electrode 44. Therefore, magnetic fields generated around the currents at both edges cancel each other, so that an ESL decreases. This can apply to the second and fourth internal electrodes 43 and 45.

As shown in FIG. 3B, the length E of opposed edges of the capacitor-forming portions 49 and 51 of the second and fourth internal electrodes 43 and 45, and the length of opposed edges of the first and third internal electrodes 42 and 44 can be freely adjusted regardless of a pitch between the external terminal electrodes 40 and 41. Accordingly, the ESR of the multilayer capacitor 31 can be easily adjusted.

Figure 5:
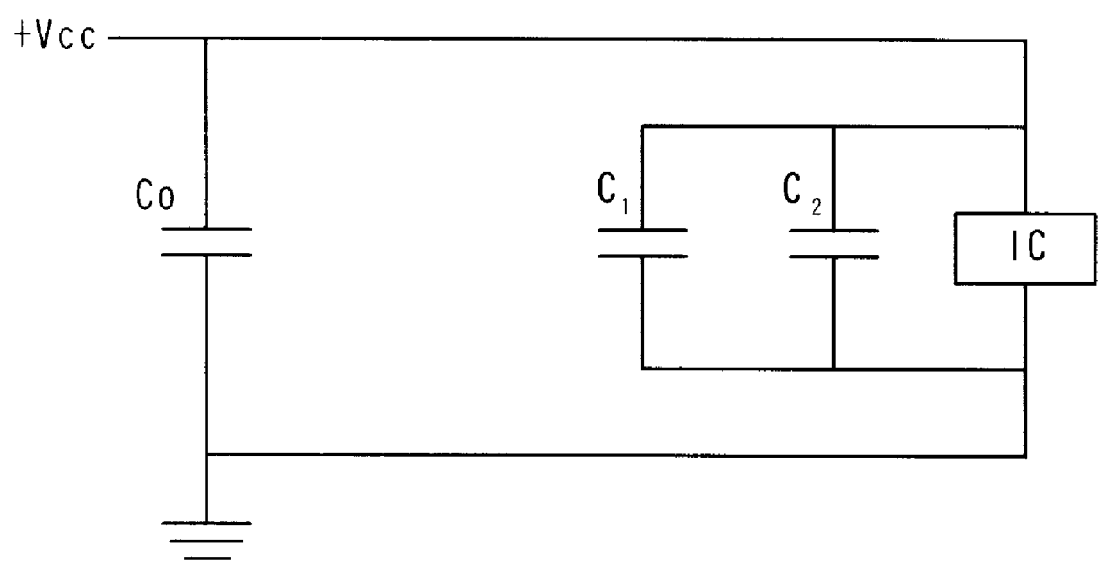
FIG. 5 is a circuit diagram showing a state in which the multilayer capacitor shown in FIG. 1 is built into a decoupling circuit.
Figure 6A:
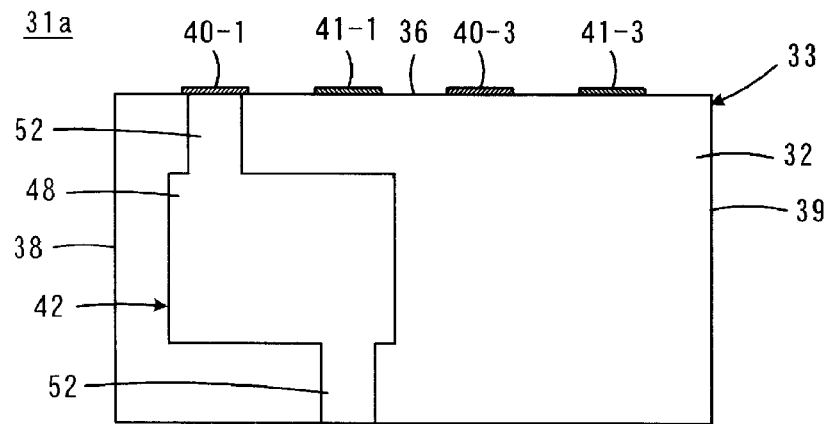
FIGS. 6A to 6D are illustrations of a multilayer capacitor according to a second preferred embodiment of the present invention, and correspond to FIGS. 3A and 3B.
Figure 6B:
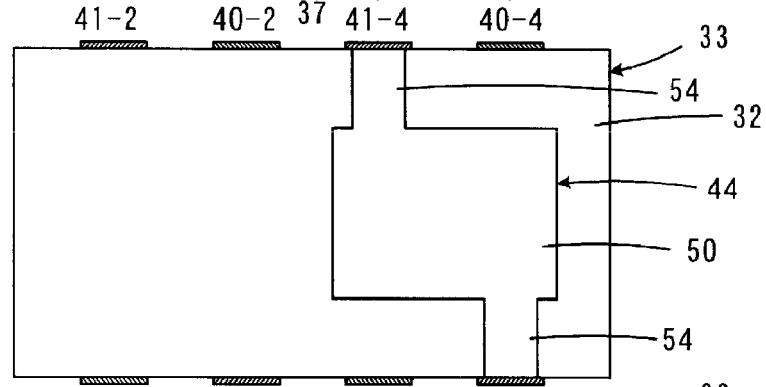
Figure 6C:
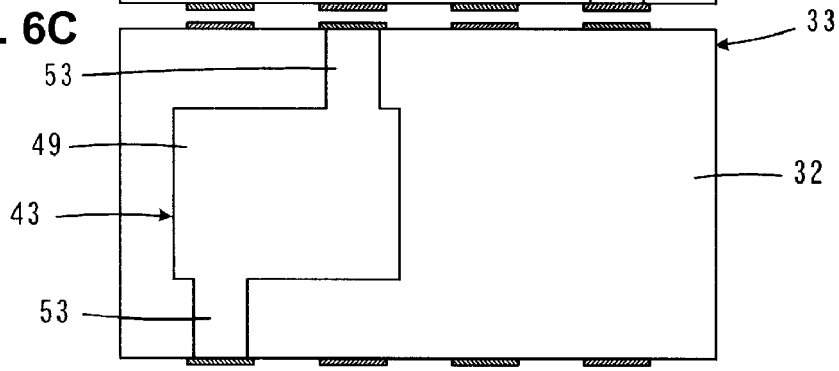
Figure 6D:
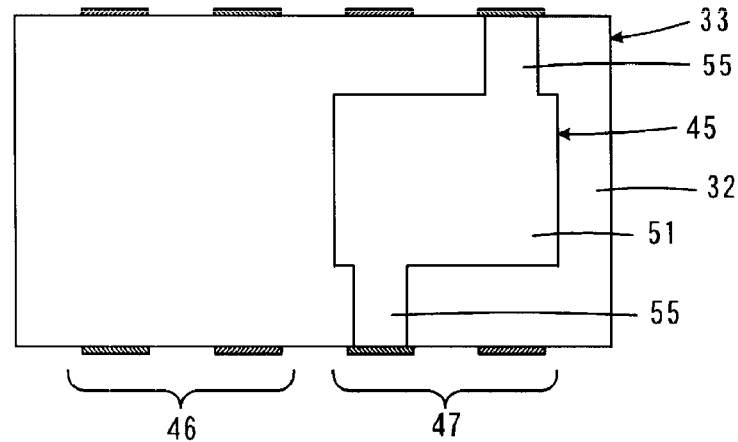

FIG. 5 is a circuit diagram showing a state in which the multilayer capacitor 31 is built into a decoupling circuit. In FIG. 5, C1 corresponds to the first capacitor portion 46, and C2 corresponds to the second capacitor portion 47. As described above, the ESLs of the first and second capacitor portions C1 and C2 are low. Thus, electric charge can be rapidly supplied to an IC (integrated circuit).

Next, an example of a method for producing the multilayer capacitor 31 is described below.

A ceramic green sheet to be used as each dielectric layer 32, conductive paste for the internal electrodes 42 to 45, and conductive paste for the external terminal electrodes 40 and 41 are prepared. The ceramic green sheet and the conductive paste include binders and solvents. As the binders and the solvents, known organic binders and known organic solvents may be used. In many cases, the conductive paste for the external terminal electrodes 40 and 41 includes a glass component.

Next, the conductive paste is printed in a predetermined pattern on the ceramic green sheet by using, for example, screen printing. This produces a ceramic green sheet on which conductive paste films to be used as the internal electrodes 42 to 45 are formed.

Next, a raw mother laminate can be obtained by laminating, in a predetermined order, such ceramic green sheets on which the conductive paste films are formed, and laminating, on and under the ceramic green sheets, a predetermined number of outer-layer ceramic green sheets on which no conductive paste films are formed. The raw mother laminate is pressed in the laminating direction by a process such as isostatic pressing, for example.

Next, the raw mother laminate is cut into a predetermined size. Accordingly, the laminate 33 in a raw state is cut out.

Next, the laminate 33 in the raw state is burned. The burning temperature is, for example, about 900° C. to about 1300° C., though it varies depending on a ceramic material included in the ceramic green sheet and a metal material included in the conductive paste film.

Next, conductive paste is applied on each of the first and second side surfaces 36 and 37 of the burned laminate 33, whereby conductive paste films for the external terminal electrodes 40 and 41 are formed. It is preferable that the conductive paste films extend from the first and second side surfaces 36 and 37 to parts of the main surfaces 34 and 35.

Next, the conductive paste films are burned, whereby the external terminal electrodes 40 and 41 are formed. The burning temperature is, for example, about 700° C. to about 900° C. In addition, as an atmosphere at the burning, atmospheres, such as atmospheric air, N2, and moisture vapor+N2, are selectively used according to a type of a metal included in the conductive paste.

As described above, the multilayer capacitor 31 is obtained. Surfaces of the external terminal electrodes 40 and 41 may be plated.

FIGS. 6A to 6D are illustrations of a multilayer capacitor 31a according to a second preferred embodiment of the present invention, and correspond to FIGS. 3A and 3B. FIGS. 6A to 6D also show a laminating order. In FIGS. 6A to 6D, elements corresponding to those shown in FIGS. 3A and 3B are denoted by identical reference numerals, and repeated descriptions are omitted.

In the multilayer capacitor 31a according to the second preferred embodiment, the first and third internal electrodes 42 and 44 are arranged at predetermined intervals along the length of each of the first and second side surfaces 36 and 37, and the first and third internal electrodes 42 and 44 are not coplanar. Similarly, the second and fourth internal electrodes 43 and 45 are arranged along the length of each of the first and second side surfaces 36 and 37, with a predetermined distance provided therebetween, and the second and fourth internal electrodes 43 and 45 are not coplanar. Therefore, in the second preferred embodiment, in brief, magnetic fields three-dimensionally cancel one another.

In the structure shown in FIG. 6, the first and third internal electrodes 42 and 44 are shifted in the laminating direction by one dielectric layer 32. Similarly, the second and fourth internal electrodes 43 and 45 are shifted in the laminating direction by one dielectric layer 32. The first and third internal electrodes 42 and 44 may be shifted in the laminating direction by two or more dielectric layers 32. Similarly, the second and fourth internal electrodes 43 and 45 may be shifted in the laminating direction by two or more dielectric layers 32.

Figure 7A:
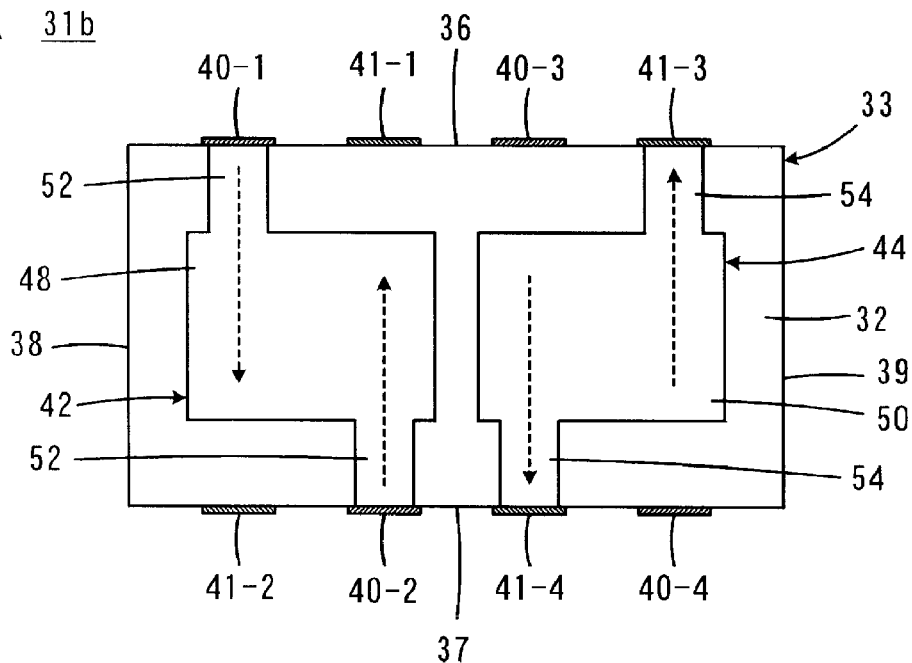
FIGS. 7A and 7B are illustrations of a multilayer capacitor according to a third preferred embodiment of the present invention, and correspond to FIGS. 4A and 4B.
Figure 7B:
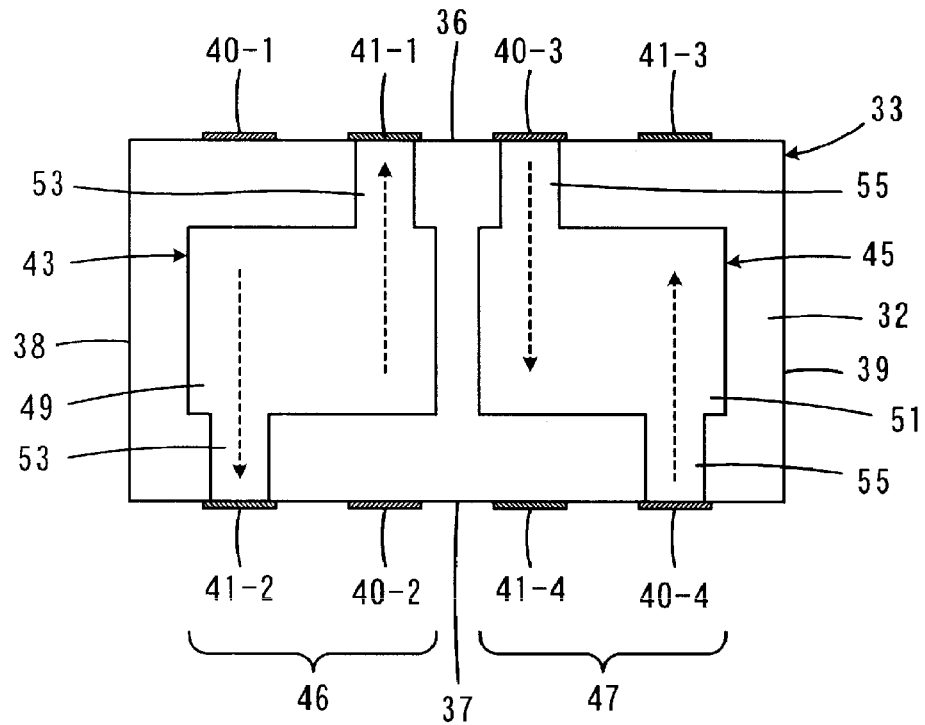

FIGS. 7A and 7B are illustrations of a multilayer capacitor 31b according to a third preferred embodiment of the present invention, and correspond to FIGS. 4A and 4B. In FIGS. 7A and 7B, elements corresponding to those shown in FIGS. 4A and 4B are denoted by identical reference numerals, and repeated descriptions are omitted.

In the multilayer capacitor 31b according to the third referred embodiment, the lead portion 52 of the first internal electrode 42 and the lead portion 54 of the internal electrode 44, which are coplanar, are adjacent to each other along the length of each of the first and second side surfaces 36 and 37, and the lead portion 53 of the second internal electrode 43 and the lead portion 55 of the fourth internal electrode 45, which are coplanar, are adjacent to each other. According to the third preferred embodiment, compared to the above-described first preferred embodiment, an effect of magnetic field cancellation in the same plane is enhanced.

FIGS. 8A to 8D are illustrations of a multilayer capacitor 31c according to a fourth preferred embodiment of the present invention, and correspond to FIGS. 3A and 3B. FIGS. 8A to 8D also show a laminating order. In FIGS. 8A to 8D, elements corresponding to those shown in FIGS. 3A and 3B are denoted by identical reference numerals, and repeated descriptions are omitted.

In the multilayer capacitor 31c according to the fourth preferred embodiment, plural sets of at least the first and second internal electrodes 42 and 43 are disposed in the laminating direction. As shown in FIG. 8A, regarding at least one of the first internal electrodes 42, the third internal electrode 44 is not positioned in a coplanar manner, and, as shown in FIG. 8B, regarding at least one of the second internal electrodes 43, the fourth internal electrode 45 is not positioned in a coplanar manner.

Preferably, the fourth preferred embodiment includes, in the laminate 33, a laminating order of, from the top, a predetermined number of outer-layer dielectric layers, repetition of the patterns shown in FIGS. 8A and 8B a predetermined number of times, repetition of the patterns shown in FIGS. 8C and 8D a predetermined number of times, repetition of the patterns shown in FIGS. 8A and 8B a predetermined number of times, and a predetermined number of outer-layer dielectric layers.

According to the fourth preferred embodiment, by reducing a number of laminating the third and fourth internal electrodes 44 and 45, the capacitance of the second capacitor portion 47 can be reduced than that of the first capacitor portion 46. In this manner, by setting the first and second capacitor portions 46 and 47 to have different capacitances, resonant frequencies of the capacitor portions 46 and 47 can be made different. Accordingly, decoupling capacitor functions are realized in a broader frequency range.

Figure 9:
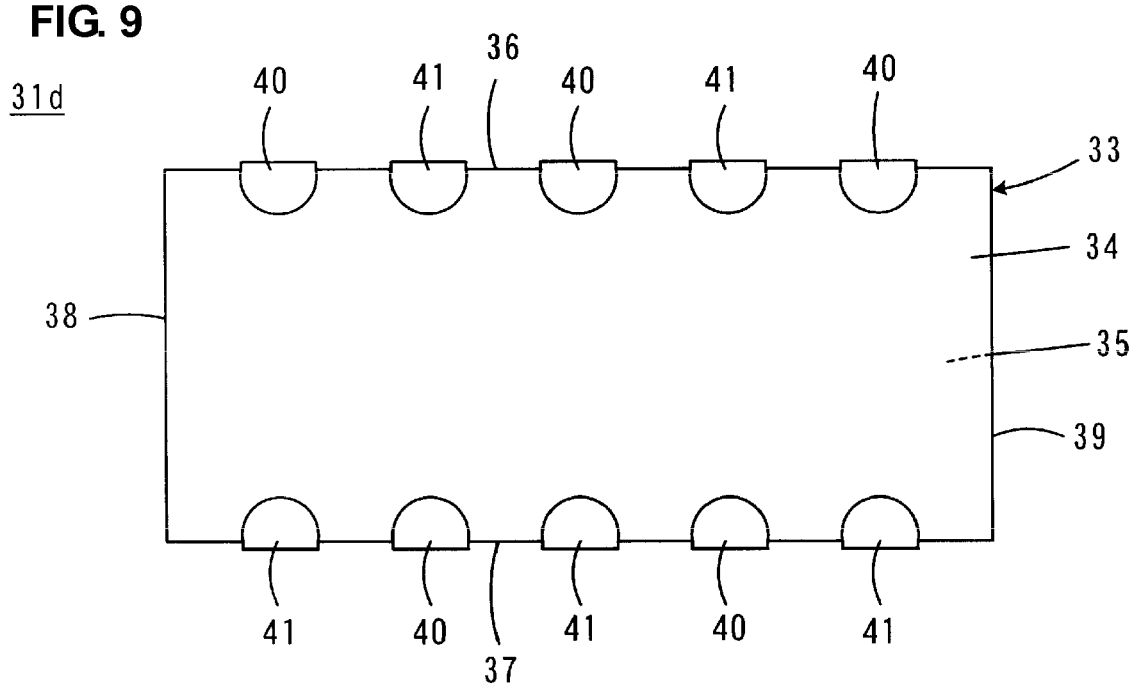
FIG. 9 is an illustration of a multilayer capacitor according to a fifth preferred embodiment of the present invention, and corresponds to FIG. 2.
Figure 10A:
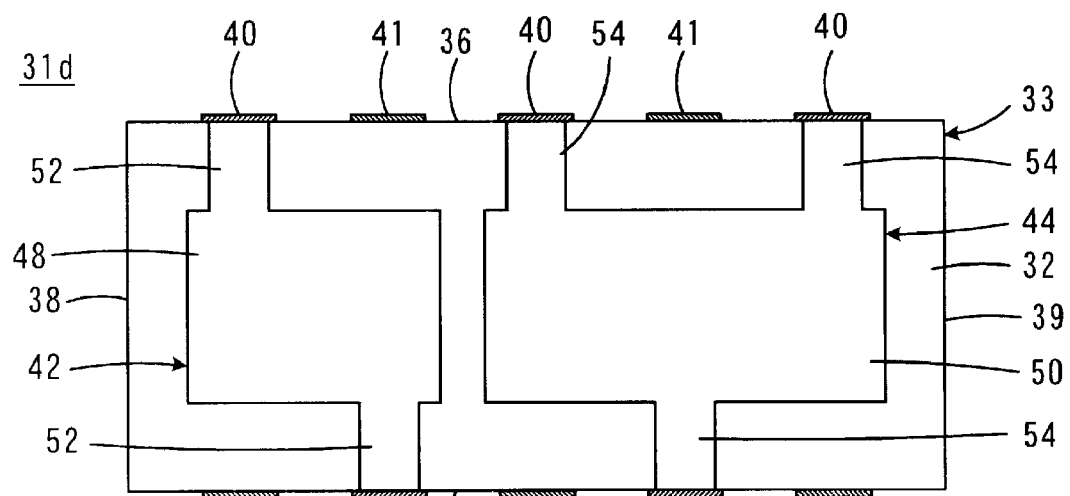
FIGS. 10A and 10B are illustrations of the multilayer capacitor shown in FIG. 9, and correspond to FIGS. 3A and 3B.
Figure 10B:
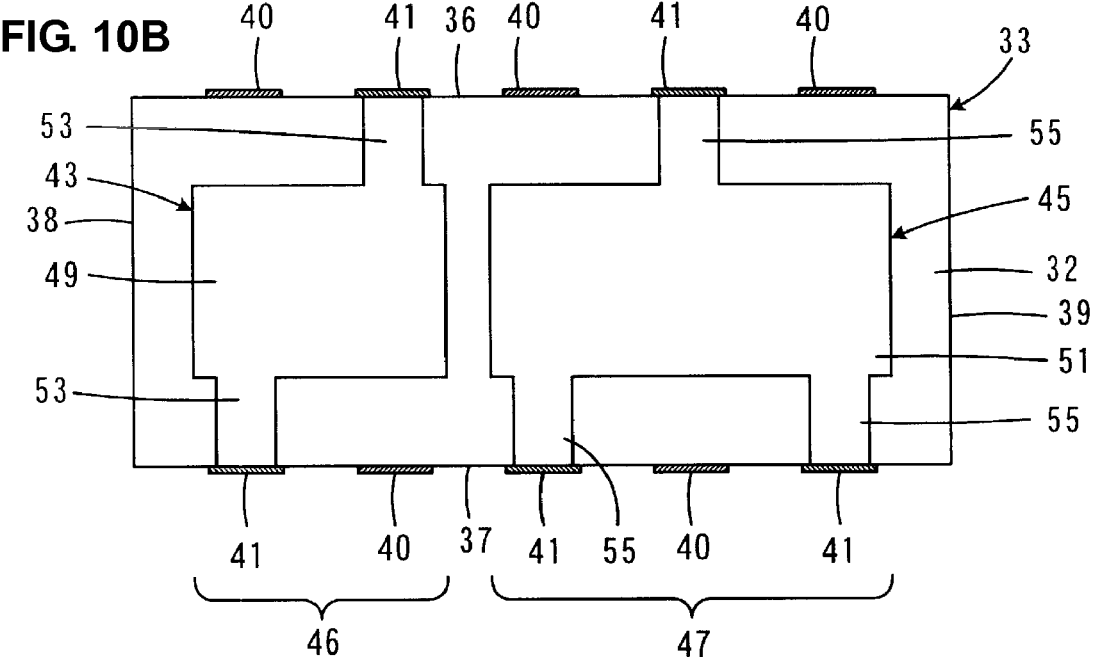

FIGS. 9, and 10A and 10B are illustrations of a multilayer capacitor 31d according to a fifth preferred embodiment of the present invention, and correspond to FIGS. 2, and 3A and 3B, respectively. In FIGS. 9, and 10A and 10B, elements corresponding to those shown in FIGS. 2, and 3A and 3B are denoted by identical reference numerals, and repeated descriptions are omitted.

In the multilayer capacitor 31d according to the fifth preferred embodiment, the areas of the capacitor-forming portions 48 and 49 of the first and second internal electrodes 42 and 43 differ from those of the capacitor-forming portions 50 and 51 of the third and fourth internal electrodes 44 and 45. More specifically, the areas of the capacitor-forming portions 50 and 51 of the third and fourth internal electrodes 44 and 45 are enlarged than those of the capacitor-forming portions 48 and 49 of the first and second internal electrodes 42 and 43. As a result, the capacitance of the second capacitor portion 47 is larger than that of the first capacitor portion 46. In addition, the numbers of lead portions 54 and 55 of the third and fourth internal electrodes 44 and 45 increase compared with ones of the first and second internal electrodes 42 and 43. In the multilayer capacitor 31d, a total of ten external terminal electrodes 40 and 41 are formed.

According to the fifth preferred embodiment, similarly to the case of the fourth preferred embodiment, by setting the first and second capacitor portions 46 and 47 to have different capacitances, the resonant frequencies of the first and second capacitor portions 46 and 47 can be made different. Thus, decoupling capacitor functions are realized in a broader frequency range. In addition, in the second capacitor portion 47, a more reduced ESL can be achieved.

Figure 11:
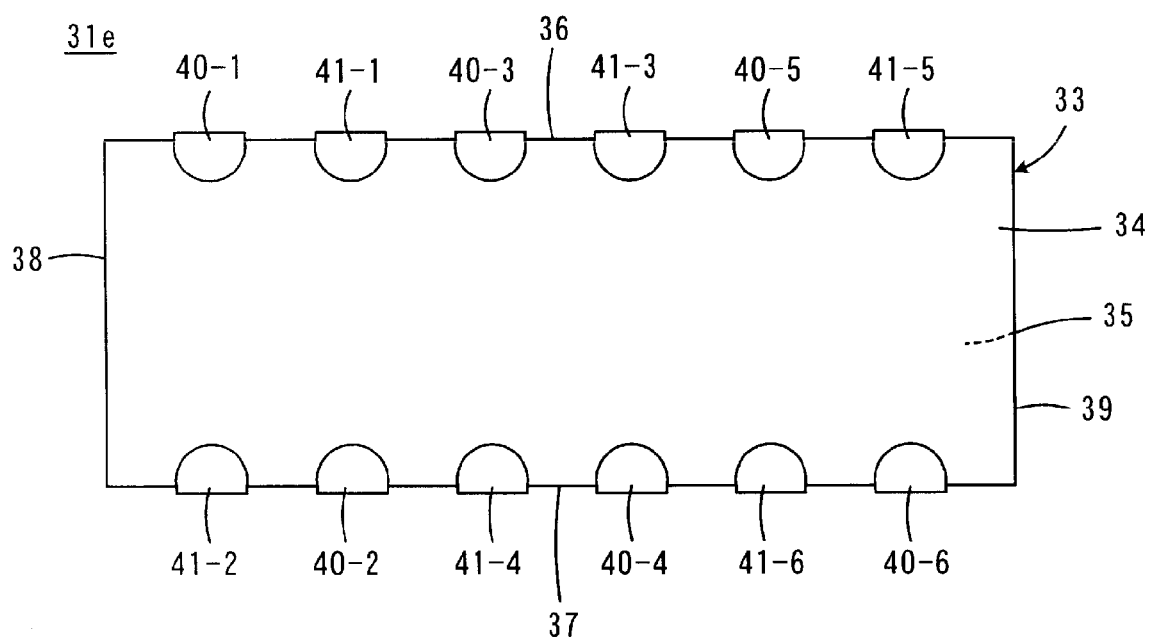
FIG. 11 is an illustration of a multilayer capacitor according to a sixth preferred embodiment of the present invention, and corresponds to FIG. 2.
Figure 12A:
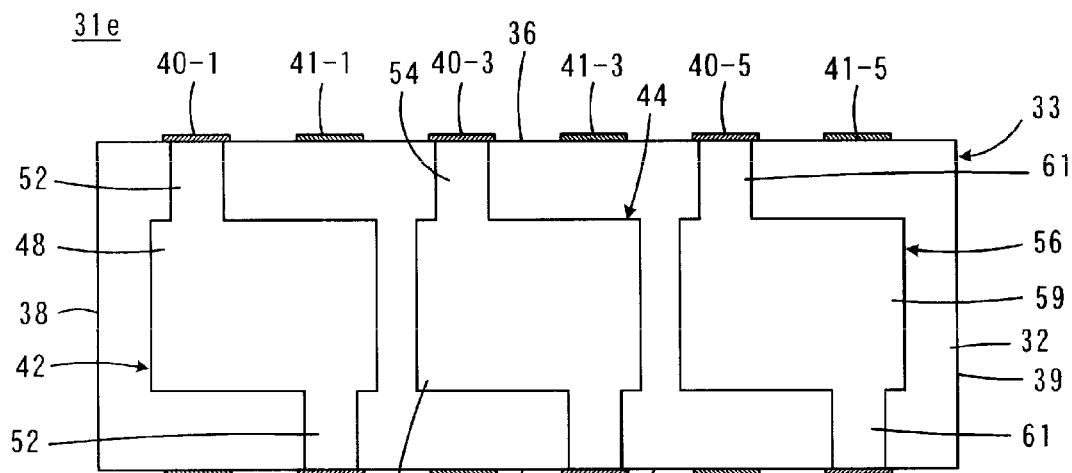
FIGS. 12A and 12B are illustrations of the multilayer capacitor shown in FIG. 11, and correspond to FIGS. 3A and 3B.
Figure 12B:
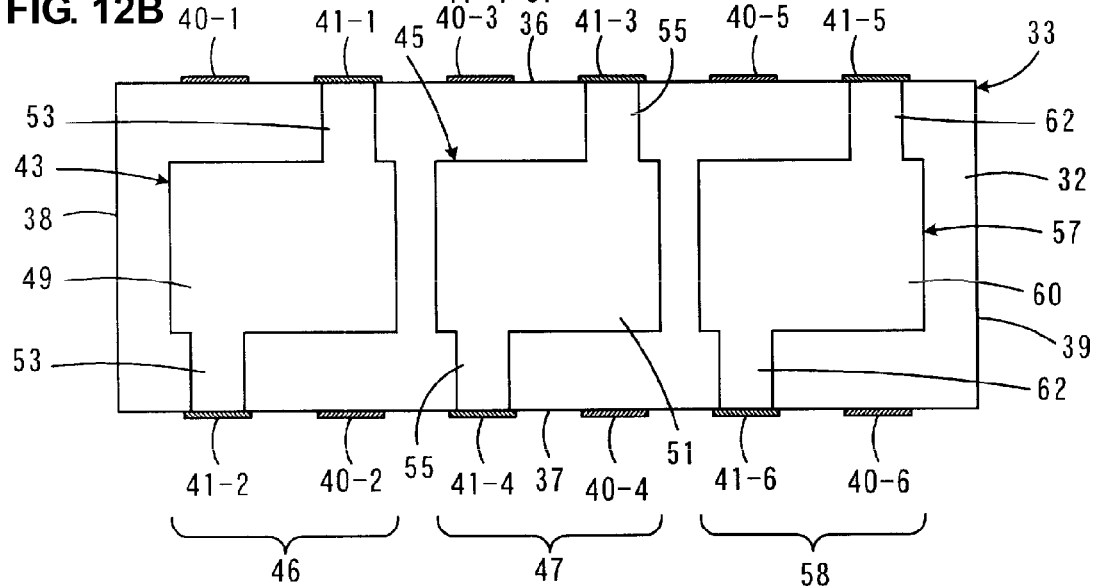
Figure 13A:
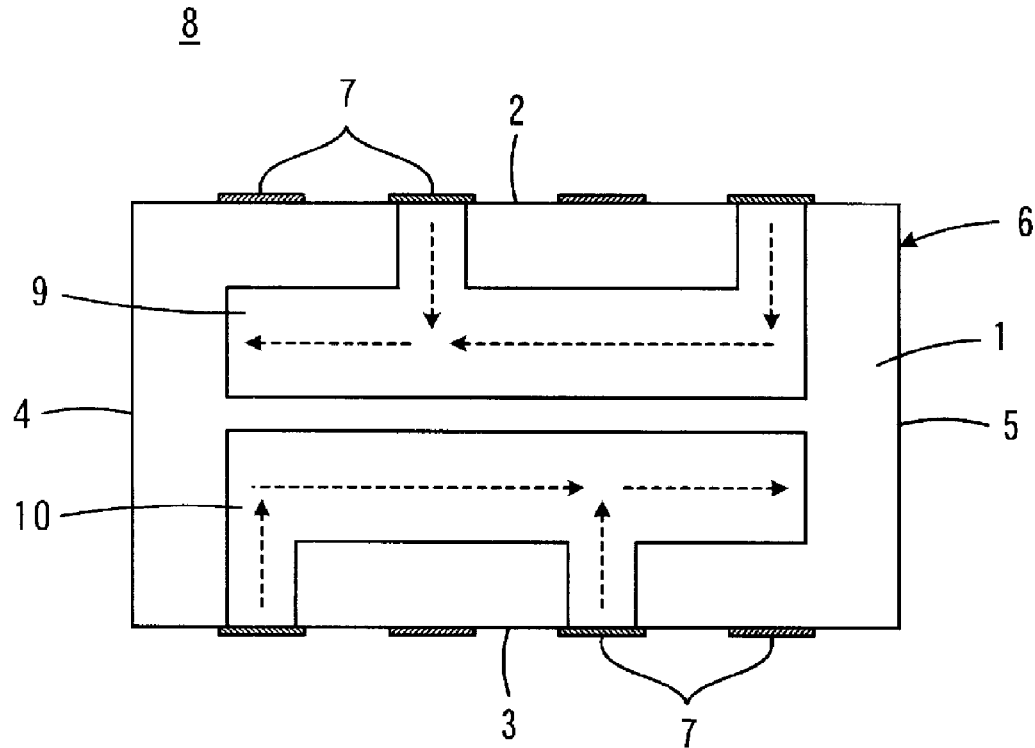
FIGS. 13A and 13B are plan views showing an internal structure of the multilayer capacitor disclosed in Japanese Unexamined Patent Application Publication No. 2002-151349 by using sections including internal electrodes.
Figure 13B:
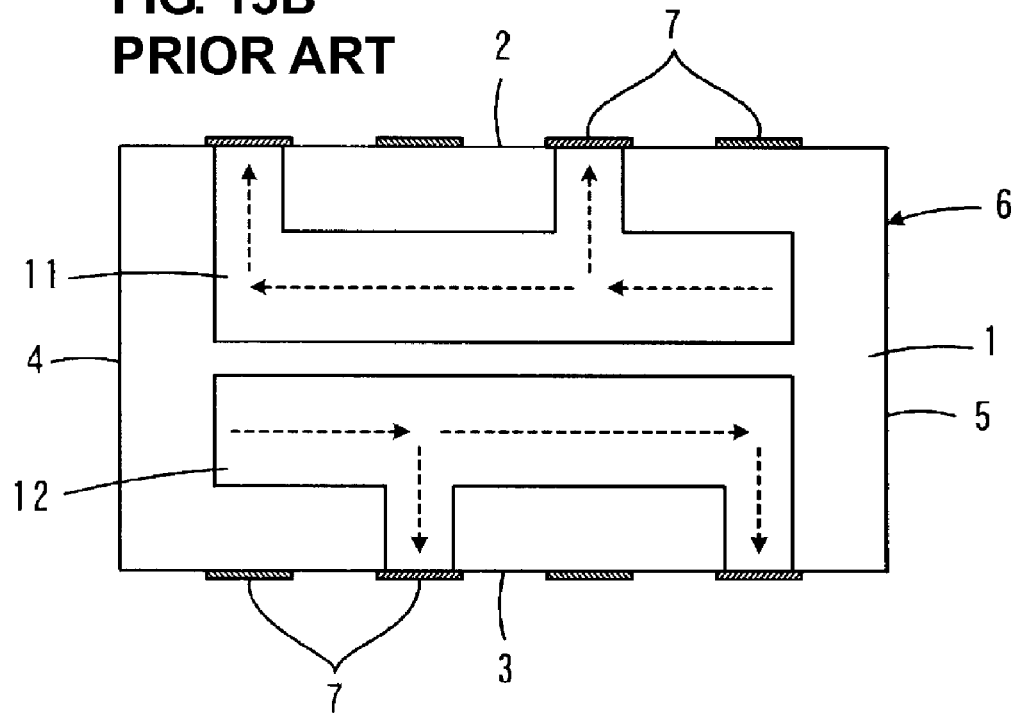
Figure 14A:
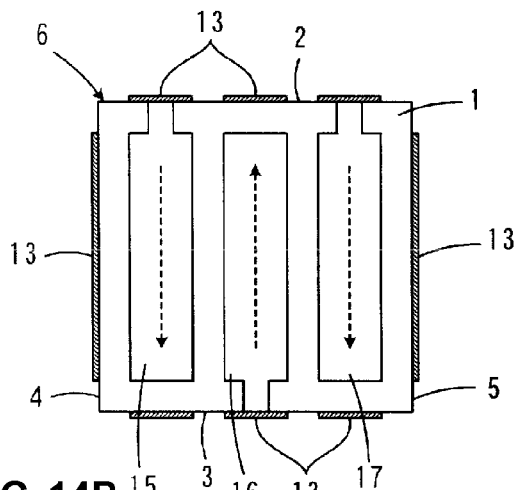
FIGS. 14A to 14D are plan views of an internal structure of the multilayer capacitor shown in Japanese Unexamined Patent Application Publication No. 2004-103883 by using sections including internal electrodes.
Figure 14B:
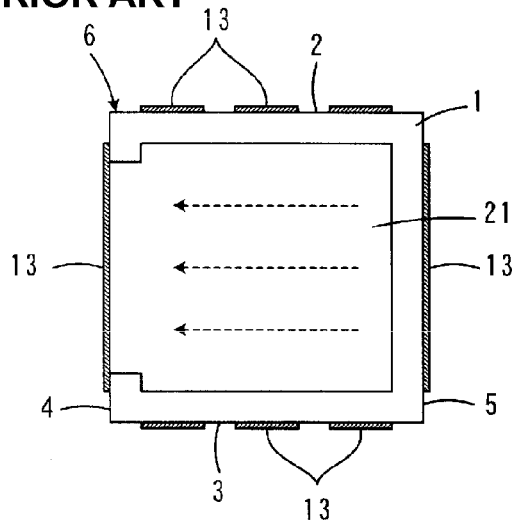
Figure 14C:
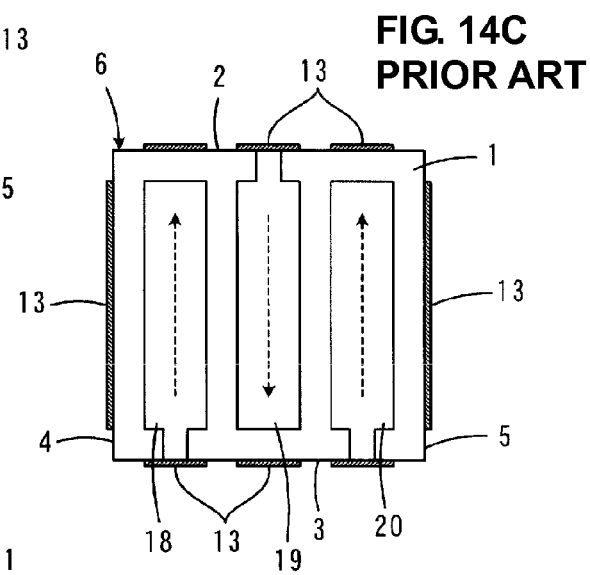
Figure 14D:
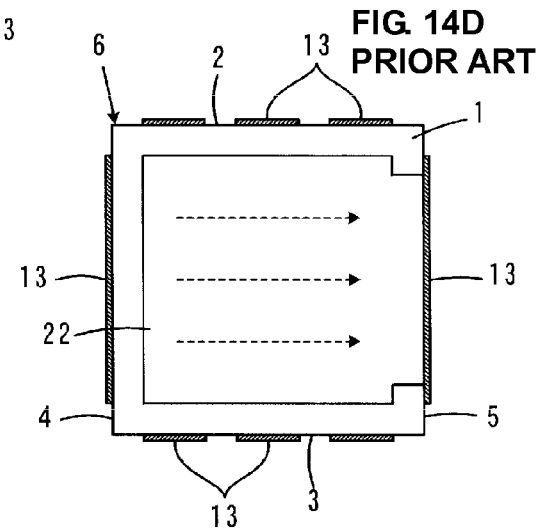
Figure 15A:
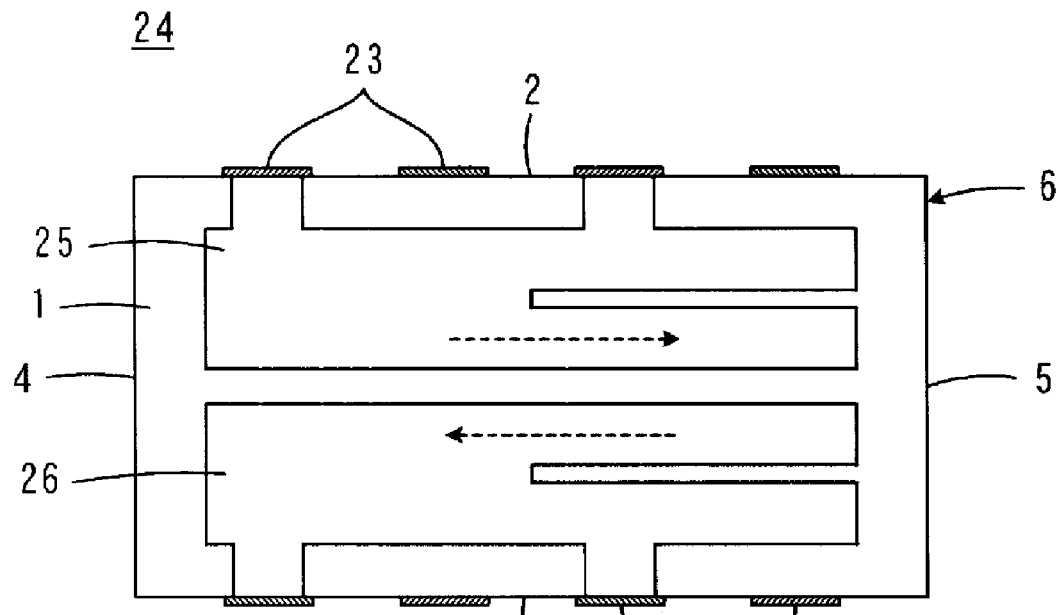
FIGS. 15A and 15B are plan views showing an internal structure of one multilayer capacitor disclosed in Japanese Unexamined Patent Application Publication No. 2006-32904 by using sections including internal electrodes.
Figure 15B:
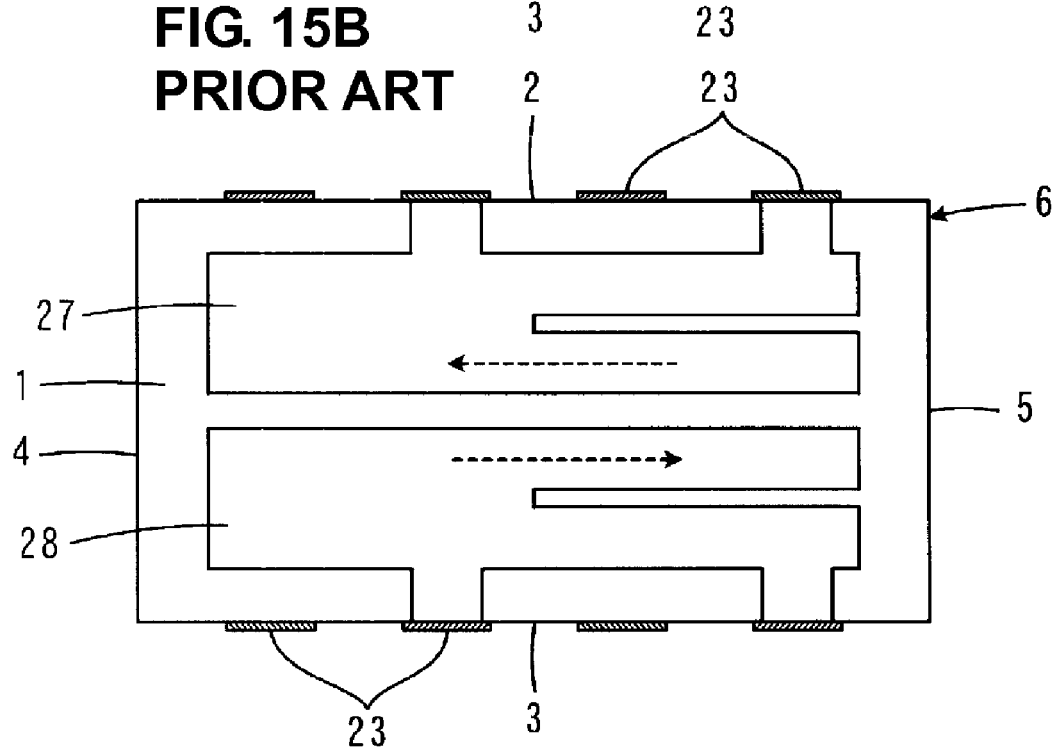
Figure 16A:
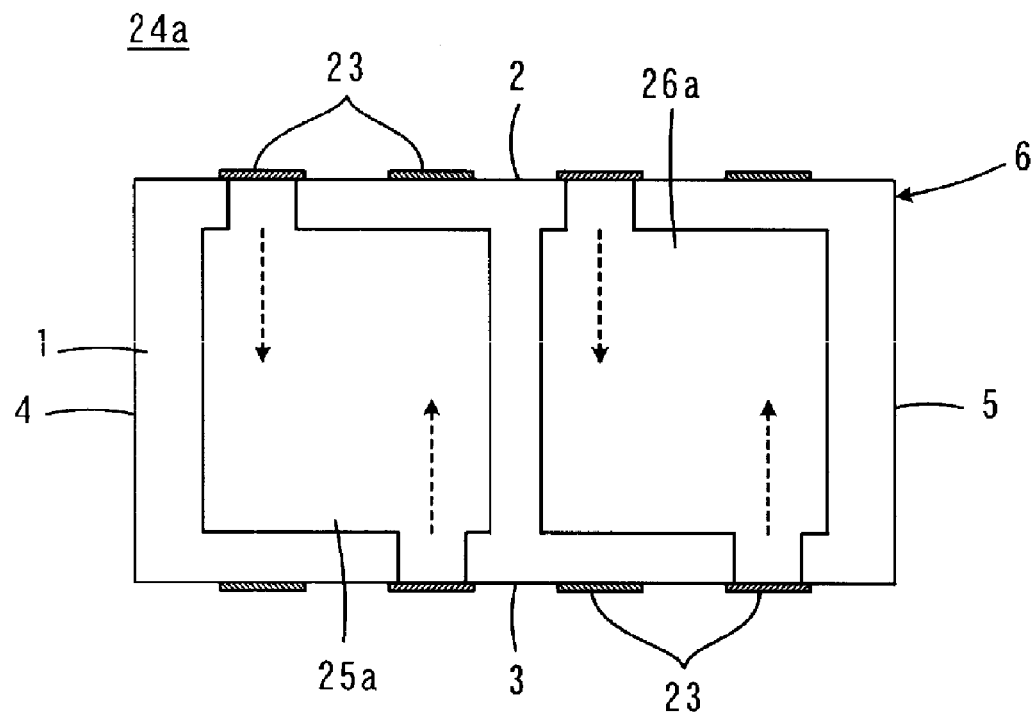
FIGS. 16A and 16B are plan views showing an internal structure of another multilayer capacitor disclosed in Japanese Unexamined Patent Application Publication No. 2006-32904 by using sections including internal electrodes.
Figure 16B:
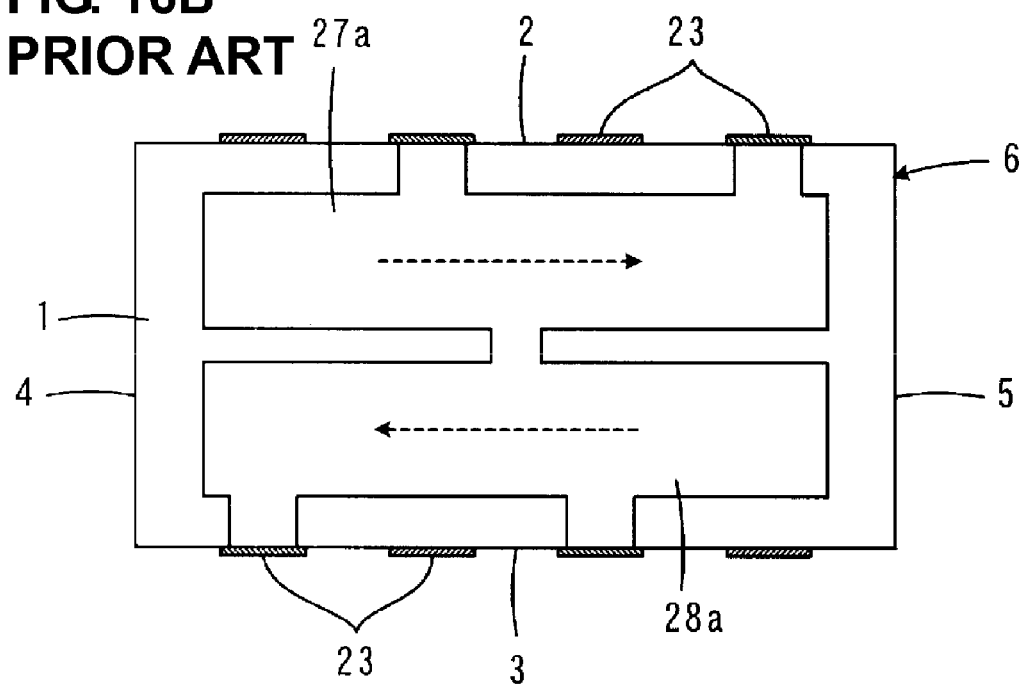

FIGS. 11, and 12A and 12B are illustrations of a multilayer capacitor 31e according to a sixth preferred embodiment of the present invention, and correspond to FIGS. 2, and 3A and 3B, respectively. In FIGS. 11, and 12A and 12B, elements corresponding to those shown in FIGS. 2, and 3A and 3B are denoted by identical reference numerals, and repeated descriptions are omitted.

In the multilayer capacitor 31e according to the sixth preferred embodiment, fifth and sixth internal electrodes 56 and 57 are added, whereby a third capacitor portion 58 is further formed.

The fifth and sixth internal electrodes 56 and 57 include capacitor-forming portions 59 and 60 that face each other, with one particular dielectric layer 32 provided therebetween. The fifth internal electrode 56 has two lead portions 61 that lead from the capacitor-forming portion 59 so as to be exposed from the first and second side surfaces 36 and 37 and electrically connected to external terminal electrodes 40-5 and 40-6. Also, the sixth internal electrode 57 has two lead portions 62 that lead from the capacitor-forming portion 60 so as to be exposed from the first and second side surfaces 36 and 37 and electrically connected to external terminal electrodes 41-5 and 41-6.

The lead portions 61 of the fifth internal electrode 56 and the lead portions 62 of the sixth internal electrode 57 are disposed so as to be alternately exposed along the length of each of the first and second side surfaces 36 and 37.

As shown in FIG. 12A, the first, third, and fifth internal electrodes 42, 44, and 56 are disposed so as to be arranged in a coplanar manner at predetermined intervals along the length of each of the first and second side surfaces 36 and 37. Similarly, as shown in FIG. 12B, the second, fourth, and sixth internal electrodes 43, 45, and 57 are disposed so as to be arranged in a coplanar manner at predetermined intervals along the length of each of the first and second side surfaces 36 and 37.

As can be understood by referring to both FIGS. 12A and 12B, when viewed in the laminating direction of the dielectric layers 32, the capacitor-forming portion 59 of the fifth internal electrode 56 does not overlap with the capacitor-forming portion 49 of the second internal electrode 43 or the capacitor-forming portion 51 of the fourth internal electrode 45, and the capacitor-forming portion 60 of the sixth internal electrode 57 does not overlap with the capacitor-forming portion 48 of the first internal electrode 42 or the capacitor-forming portion 50 of the third internal electrode 44.

In this manner, by increasing the number of capacitor portions, for example, setting the first to third capacitor portions 46, 47, and 58 to have different capacitances, decoupling capacitor functions can be realized in a broader frequency range. In addition, since the capacitor portions 46, 47, and 58 are separate, the number of capacitor portions is not limited to three, and can be arbitrarily increased, thus enabling high design flexibility.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A multilayer capacitor comprising:
   a laminate including a plurality of laminated dielectric layers and having first and second side surfaces facing each other; and
   a plurality of external terminal electrodes disposed on the first and second side surfaces; wherein
   in the laminate, first and second internal electrodes are arranged to define a first capacitor portion, and third and fourth internal electrodes are arranged to define a second capacitor portion;
   the first and second internal electrodes include capacitor-forming portions that face each other, with a particular dielectric layer provided between the capacitor-forming portions, and at least two lead portions which lead from the capacitor-forming portions so as to be exposed from the first and second side surfaces and electrically connected to particular external terminal electrodes among the plurality of external terminal electrodes, and the lead portion of the first internal electrode and the lead portion of the second internal electrode are disposed so as to be alternately exposed along the length of each of the first and second side surfaces;
   the third and fourth internal electrodes include capacitor-forming portions that face each other, with a particular dielectric layer provided between the capacitor-forming portions, and at least two lead portions which lead from the capacitor-forming portions so as to be exposed from the first and second side surfaces and electrically connected to particular external terminal electrodes among the plurality of external terminal electrodes, and the lead portion of the third internal electrode and the lead portion of the fourth internal electrode are disposed so as to be alternately exposed along the length of each of the first and second side surfaces;
   the first and third internal electrodes are disposed so as to be arranged along the length of each of the first and second side surfaces, with a predetermined distance provided between the first and third internal electrodes;
   the second and fourth internal electrodes are disposed so as to be arranged along the length of each of the first and second side surfaces, with a predetermined distance provided between the second and fourth internal electrodes; and
   when viewed in a laminating direction of the dielectric layers, the capacitor-forming portion of the first internal electrode does not overlap with the capacitor-forming portion of the fourth internal electrode, and the capacitor-forming portion of the second internal electrode does not overlap with the capacitor-forming portion of the third internal electrode.

2. The multilayer capacitor according to claim 1, wherein, along the length of each of the first and second side surfaces, the lead portion of the first internal electrode is adjacent to the lead portion of the third internal electrode, and the lead portion of the second internal electrode is adjacent to the lead portion of the fourth internal electrode.

3. The multilayer capacitor according to claim 1, wherein the first and third internal electrodes are positioned in a coplanar manner, and the second and fourth internal electrodes are positioned in a coplanar manner.

4. The multilayer capacitor according to claim 3, wherein, in the laminating direction, plural sets of the first and second internal electrodes are disposed, and, regarding at least one of the first internal electrodes, the third internal electrode is not positioned in a coplanar manner, and, regarding at least one of the second internal electrodes, the fourth internal electrode is not positioned in a coplanar manner.

5. The multilayer capacitor according to claim 1, wherein the first and third internal electrodes are positioned so as to be shifted in the laminating direction, and the second and fourth internal electrodes are positioned so as to be shifted in the laminating direction.

6. The multilayer capacitor according to claim 1, wherein the areas of the capacitor-forming portions of the first and second internal electrodes differ from the areas of the capacitor-forming portions of the third and fourth internal electrodes.

7. The multilayer capacitor according to claim 6, wherein the number of lead portions of the internal electrodes, which include capacitor-forming portions having larger areas, is greater than the number of lead portions of the internal electrodes, which include capacitor-forming portions having smaller areas.

8. The multilayer capacitor according to claim 1, wherein:
in the laminate, fifth and sixth internal electrodes are arranged to define a third capacitor portion;
the fifth and sixth internal electrodes include capacitor-forming portions that face each other, with a particular dielectric layer provided between the capacitor-forming portions, and at least two lead portions which lead from the capacitor-forming portions so as to be exposed from the first and second side surfaces and electrically connected to particular external terminal electrodes among the plurality of external terminal electrodes, and the lead portion of the fifth internal electrode and the lead portion of the sixth internal electrode are disposed so as to be alternately exposed along the length of each of the first and second side surfaces;
the first, third, and fifth internal electrodes are disposed so as to be arranged at predetermined intervals along the length of each of the first and second side surfaces;
the second, fourth, and sixth internal electrodes are disposed so as to be arranged at predetermined intervals along the length of each of the first and second side surfaces; and
when viewed in the laminating direction of the dielectric layers, the capacitor-forming portion of the fifth internal electrode does not overlap with the capacitor-forming portion of the second internal electrode or the capacitor-forming portion of the fourth internal electrode, and the capacitor-forming portion of the sixth internal electrode does not overlap with the capacitor-forming portion of the first internal electrode or the capacitor-forming portion of the third internal electrode.

9. The multilayer capacitor according to claim 1, wherein the laminate has a substantially rectangular parallelepiped shape.

* * * * *